United States Patent
Harada et al.

(10) Patent No.: US 10,910,648 B2
(45) Date of Patent: Feb. 2, 2021

(54) ACTIVE MATERIAL, ELECTRODE, SECONDARY BATTERY, BATTERY PACK, AND VEHICLE

(71) Applicant: KABUSHIKI KAISHA TOSHIBA, Minato-ku (JP)

(72) Inventors: Yasuhiro Harada, Isehara (JP); Norio Takami, Yokohama (JP); Kazuki Ise, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 130 days.

(21) Appl. No.: 16/119,014

(22) Filed: Aug. 31, 2018

(65) Prior Publication Data
US 2019/0288283 A1 Sep. 19, 2019

(30) Foreign Application Priority Data
Mar. 16, 2018 (JP) ................................. 2018-049342

(51) Int. Cl.
*H01M 4/52* (2010.01)
*H01M 4/525* (2010.01)
(Continued)

(52) U.S. Cl.
CPC ............ *H01M 4/525* (2013.01); *B60L 58/10* (2019.02); *C01G 49/0009* (2013.01); *C01G 49/0054* (2013.01); *H01M 10/425* (2013.01); *C01P 2002/70* (2013.01); *C01P 2004/04* (2013.01); *C01P 2006/40* (2013.01); *H01M 2004/027* (2013.01); *H01M 2010/4271* (2013.01)

(58) Field of Classification Search
CPC .......................... C01G 49/0009; H01M 4/525
See application file for complete search history.

(56) References Cited

U.S. PATENT DOCUMENTS 9,698,417 B2 * 7/2017 Buannic ................. C01G 33/00
9,806,338 B2 * 10/2017 Dai ........................ H01M 4/485
(Continued)

FOREIGN PATENT DOCUMENTS

CN 105826554 A 8/2016
JP 2010-287496 12/2010
(Continued)

OTHER PUBLICATIONS

Catti et al, Neutron Diffraction and Electrochemical Study of FeNb11O29/Li11FeNb11O29 for Lithium Battery Anode Applications, Chemistry of Materials, 26, pp. 22-3-2209. (Year: 2014).*
(Continued)

*Primary Examiner* — Amanda C. Walke
(74) *Attorney, Agent, or Firm* — Oblon, McClelland, Maier & Neustadt, L.L.P.

(57) ABSTRACT

According to one embodiment, an active material is provided. The active material includes a lithium niobium composite oxide represented by a general formula $Li_xFe_{1-y}M1_yNb_{11-z}M2_zO_{29}$ (1) and having an orthorhombic crystal structure. In the general formula (1), $0 \leq x \leq 23$, $0 \leq y \leq 1$ and $0 < z \leq 6$ are satisfied. Each of M1 and M2 independently includes at least one element selected from a group consisting of Fe, Mg, Al, Cu, Mn, Co, Ni, Zn, Sn, Ti, Ta, V, and Mo.

14 Claims, 7 Drawing Sheets

(51) Int. Cl.
    *B60L 58/10*     (2019.01)
    *H01M 10/42*     (2006.01)
    *C01G 49/00*     (2006.01)
    *H01M 4/02*     (2006.01)

(56) References Cited

U.S. PATENT DOCUMENTS

| | | |
|---|---|---|
| 2014/0120380 A1 | 5/2014 | Inagaki et al. |
| 2014/0120404 A1 | 5/2014 | Ise et al. |
| 2018/0277835 A1* | 9/2018 | Ise .................. H01M 10/0567 |
| 2019/0252131 A1* | 8/2019 | Zhamu .................. H01G 11/06 |

FOREIGN PATENT DOCUMENTS

| | | |
|---|---|---|
| JP | 2016-510304 | 4/2016 |
| JP | 2017-59397 A | 3/2017 |
| JP | 6092073 | 3/2017 |
| JP | 6200533 | 9/2017 |

OTHER PUBLICATIONS

Hu et al, "TiCr0.5Nb10.5O29/CNTs nanocomposite as an advanced anode material for high-performance Li+-ion storage", Journal of Alloys and Compounds, vol. 732, pp. 116-123. (Year: 2018).*

Wen et al, "Enhanced electrochemical properties of vanadium-doped titanium niobate as a new anode material for lithium-ion batteries" Electrochimica Acta, vol. 186, pp. 58-63. (Year: 2015).*

Xiaoming Lou, et al., "Exploration of $Cr_{0.2}Fe_{0.8}Nb_{11}O_{29}$ as an advanced anode material for lithium-ion batteries of electric vehicles," Electrochimica Acta 245, 2017, pp. 482-488.

Ilya Pinus, et al., "Neutron Diffraction and Electrochemical Study of $FeNb_{11}O_{29}/Li_{11}FeNb_{11}O_{29}$ for Lithium Battery Anode Applications," Chemistry of Materials, 2014, pp. 2203-2209.

* cited by examiner

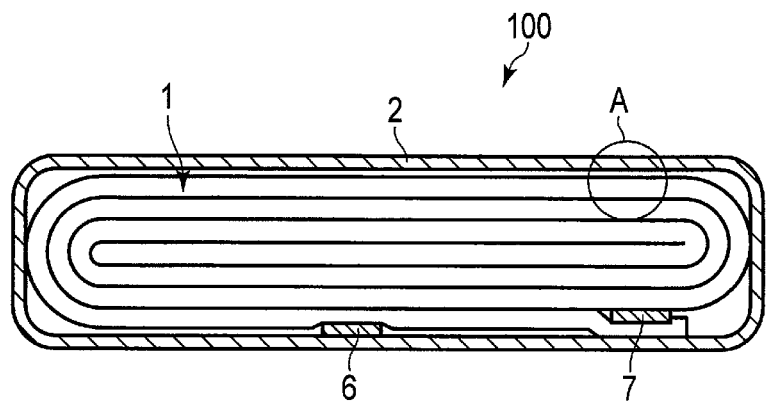
F I G. 3
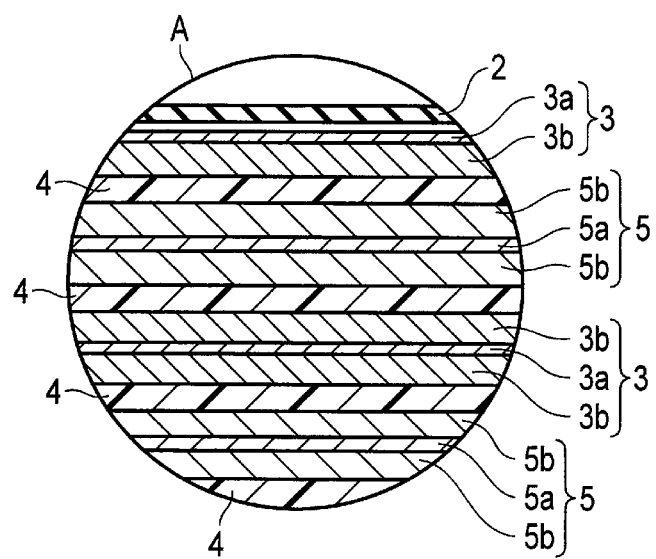
F I G. 4

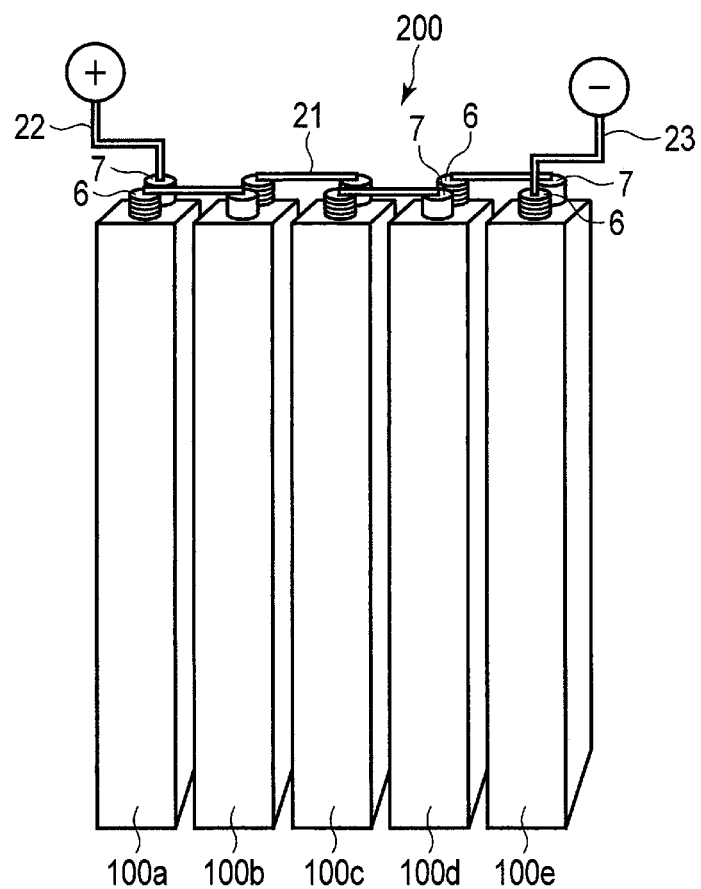
F I G. 7

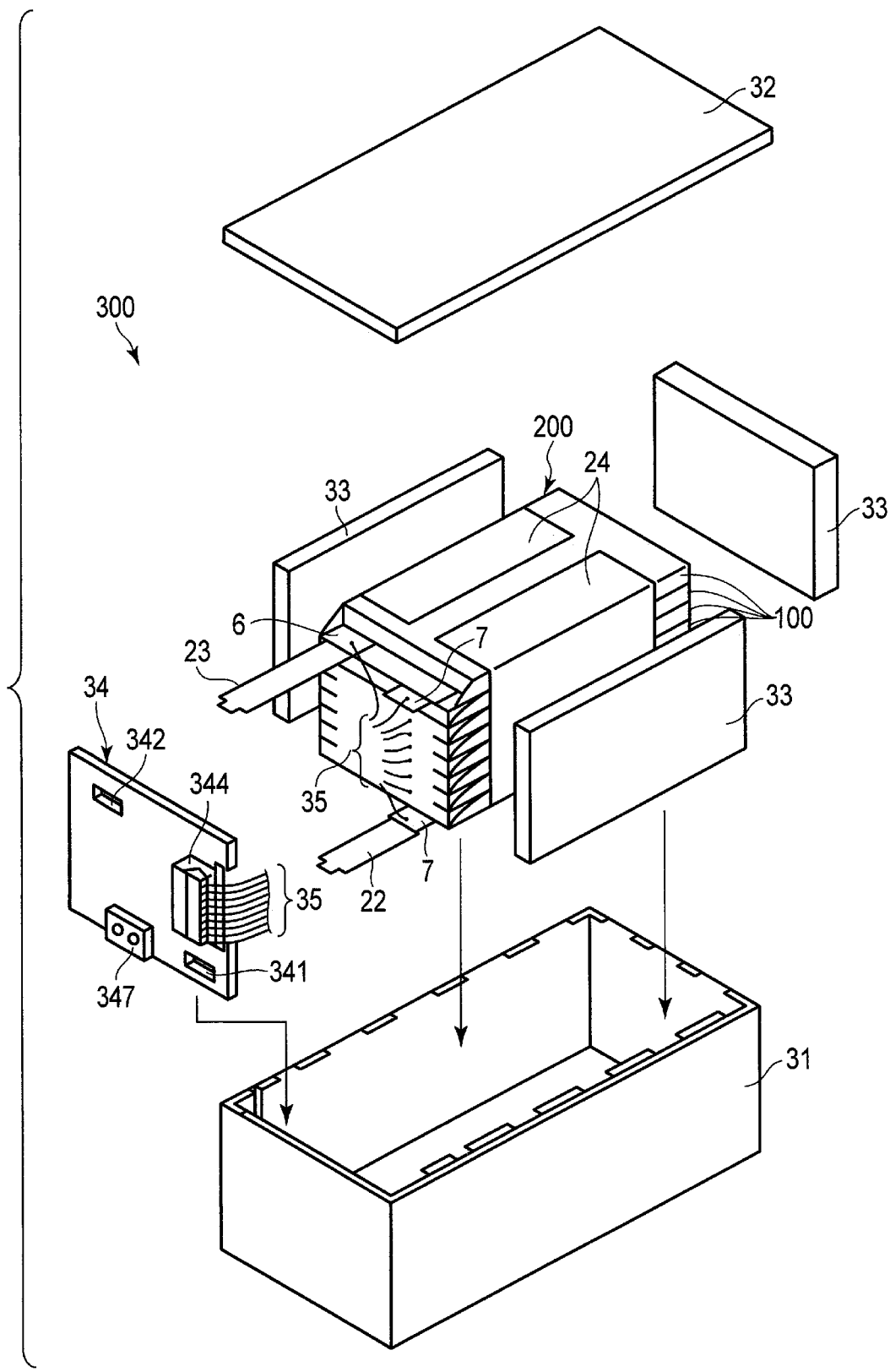
F I G. 8

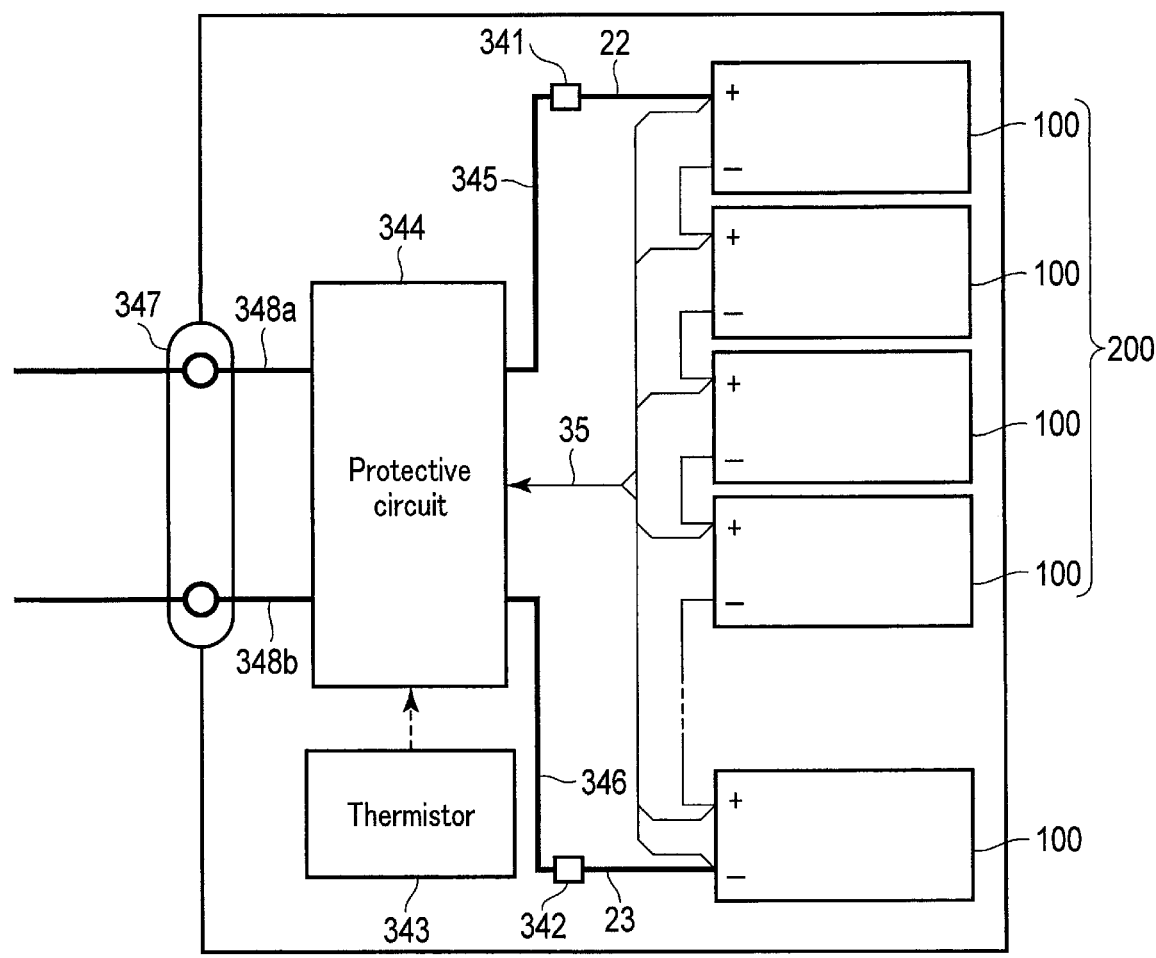
F I G. 9
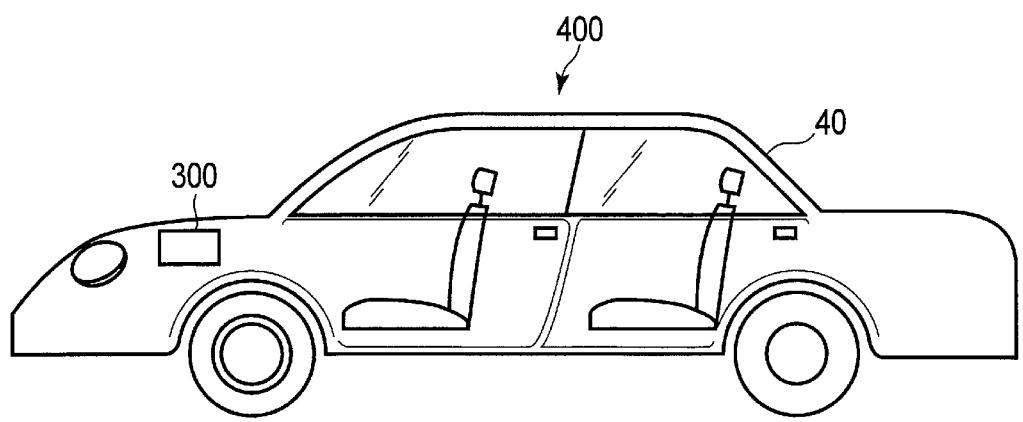
F I G. 10

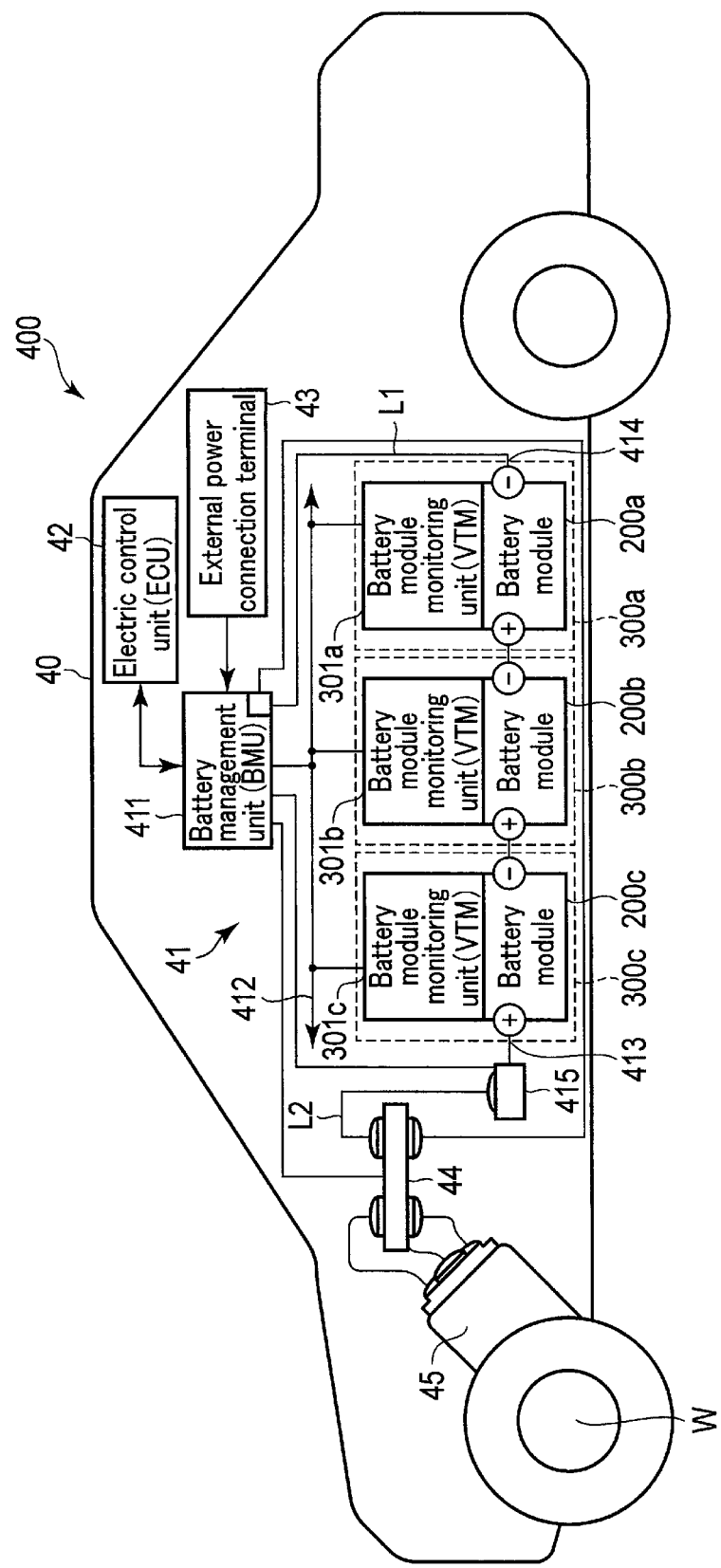
F I G. 11

… (1)

ACTIVE MATERIAL, ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2018-049342, filed Mar. 16, 2018, the entire contents of which are incorporated herein by reference.

FIELD

Embodiments described herein relate generally to an active material, an electrode, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, the electrode potential an oxide of titanium is about 1.5 V (vs. $Li/Li^+$) relative to metallic lithium, which is higher (i.e., more noble) in comparison to potentials of carbon based negative electrodes. The potential of an oxide of titanium is attributed to the redox reaction between $Ti^{3+}$ and $Ti^{4+}$ upon electrochemical insertion and extraction of lithium, and is therefore electrochemically restricted. It is also a fact that rapid charge/discharge of lithium ions can be performed stably at a high electrode potential of about 1.5 V (vs. $Li/Li^+$). Conventionally, it has therefore been difficult to drop the potential of the electrode in order to improve the energy density.

On the other hand, considering the capacity per unit weight, the theoretical capacity of titanium dioxide (anatase structure) is about 165 mAh/g, and the theoretical capacity of spinel type lithium-titanium composite oxides such as $Li_4Ti_5O_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

BRIEF DESCRIPTION OF THE DRAWINGS

FIG. 3 is a cross-sectional view schematically showing an example of a secondary battery according to an embodiment;

FIG. 4 is an enlarged cross-sectional view of section A of the secondary battery shown in FIG. 3;

FIG. 7 is a perspective view schematically showing an example of a battery module according to an embodiment;

FIG. 8 is an exploded perspective view schematically showing an, example of a battery pack according to an embodiment;

FIG. 9 is a block diagram showing an example of an electric circuit of the battery pack shown in FIG. 8;

FIG. 10 is a cross-sectional view schematically showing an example of a vehicle according to an embodiment; and FIG. 11 is a diagram schematically showing another example of the vehicle according to the embodiment.

DETAILED DESCRIPTION

Figure 1:
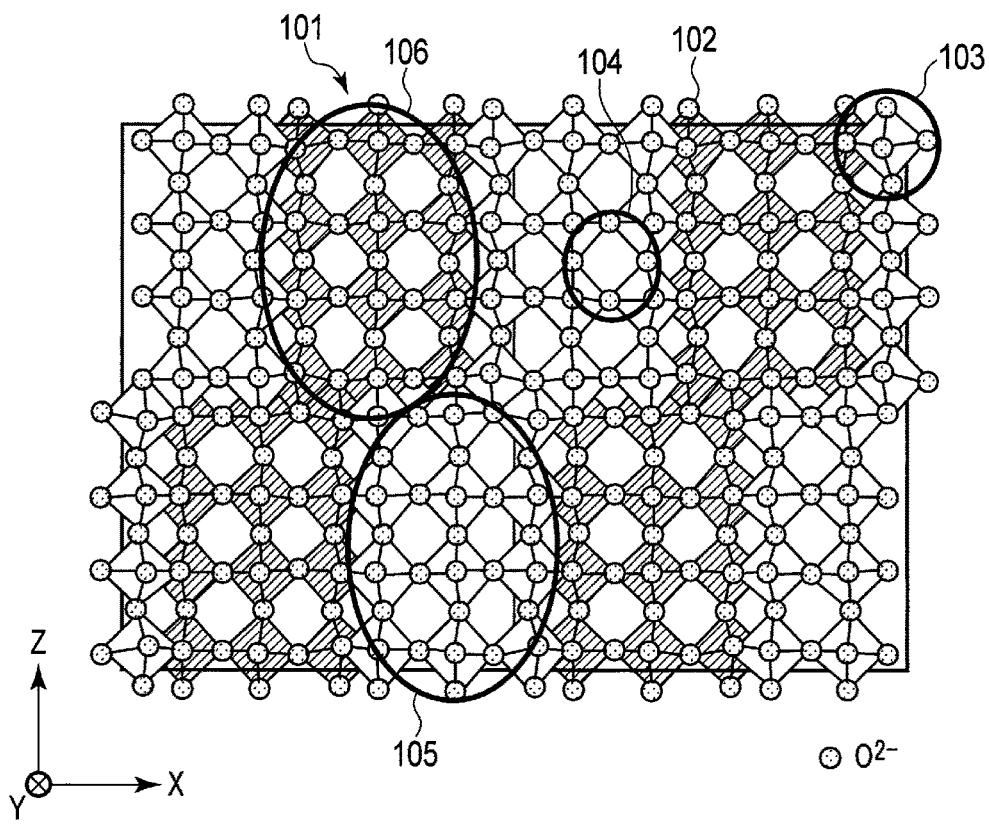
FIG. 1 is a schematic diagram showing the crystal structure of orthorhombic $Fe_{0.9}Ti_{0.1}Nb_{10.9}Sn_{0.1}O_{29}$.

According to a first embodiment, an active material is provided. The active material includes a lithium niobium composite oxide represented by a general formula $Li_xFe_{1-y}M1_yNb_{11-z}M2_zO_{29}$ (1) and having an orthorhombic crystal structure. In the general formula (1), $0 \leq x \leq 23$, $0 \leq y \leq 1$, and $0 < z \leq 6$ are satisfied. Each of M1 and M2 independently includes at least one element selected from a group consisting of Fe, Mg, Al, Cu, Mn, Co, Ni, Zn, Sn, Ti, Ta, V, and Mo.

According to a second embodiment, an electrode is provided. The electrode includes the active material according to the first embodiment.

According to a third embodiment, there is provided a secondary battery including a negative electrode, a positive electrode, and an electrolyte. The negative electrode is the electrode according to the second embodiment.

According to a fourth embodiment, a battery pack is provided. The battery pack includes the secondary battery according to the third embodiment.

According to a fifth embodiment, a vehicle is provided. The vehicle includes the battery pack according to the fourth embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an active material is provided. The active material includes a lithium niobium composite oxide represented by a general formula $Li_xFe_{1-y}M1_yNb_{11-z}M2_zO_{29}$ (1) and having an orthorhombic crystal structure. In the general formula (1), $0 \leq x \leq 23$, $0 \leq y \leq 1$, and $0 < z \leq 6$ are satisfied. Each of M1 and M2 independently includes at least one element selected from a group consisting of Fe, Mg, Al, Cu, Mn, Co, Ni, Zn, Sn, Ti, Ta, V, and Mo. The active material may be used as, for example, an active material for batteries.

For active materials capable of allowing Li ions to be inserted and extracted, it is generally considered that a solid, which has a crystal structure having higher symmetry and sites being equivalent to each other, allows Li ions to be diffused easily inside the solid, thereby improving the battery performance. This idea can be applied to a simple cubic system of crystal structure. In the orthorhombic crystal structure, however, the distance between Li and oxide ions is not uniform in a place called a bottleneck surrounded by oxide ions when Li diffuses. Therefore, there is a problem that a localized position of Li ions is difficult to stabilize due to the occurrence of thermal vibration or the like. Accordingly, the apparent activation energy of Li ion conduction in the bottleneck portion increases and so particularly, low-temperature performance tends to deteriorate.

According to the active material according to an embodiment, by substituting an element having a different ion radius or a different valence number in constituent elements, light and shade of an electron cloud is generated in the bottleneck portion so that a state in which Li ions are likely to be attracted to oxide ions can be created.

Accordingly, the apparent activation energy of Li ion conduction can be lowered. The present inventors focused on the fact that Nb has a strong electron correlation with oxide ions and found for the first time that a great effect can be achieved in the improvement of low-temperature performance by substituting at least the Nb site with a specific element.

The orthorhombic composite oxide represented by the general formula $Li_xFe_{1-y}M1_yNb_{11-z}M2_zO_{29}$ ($0 \leq x \leq 23$, $0 \leq y \leq 1$, $0 < z \leq 6$) may have about 1.5 V (vs. $Li/Li^+$) of lithium insertion/extraction potential. Therefore, the active material according to an embodiment can realize a secondary battery that can exhibit stable, repetitive, and quick charge/discharge characteristics.

Further, for a reason described below in detail, the orthorhombic composite oxide represented by the general formula $Li_xFe_{1-y}M1_yNb_{11-z}M2_zO_{29}$ ($0 \leq x \leq 23$, $0 \leq y \leq 1$, $0 < z \leq 6$) can realize a secondary battery that can exhibit high energy densities in addition to stable, repetitive, and quick charge/discharge characteristics. Therefore, the active material according to the embodiment can realize a secondary battery capable of exhibiting excellent quick charge/discharge performance and high energy densities.

As an example of the orthorhombic composite oxide represented by the general formula $Li_xFe_{1-y}M1_yNb_{11-z}M2_zO_{29}$ ($0 \leq x \leq 23$, $0 \leq y \leq 1$, $0 < z \leq 6$), a schematic diagram of the crystal structure of the orthorhombic composite oxide $Fe_{0.9}Ti_{0.1}Nb_{10.9}Sn_{0.1}O_{29}$ is shown in FIG. 1.

When the active material according to the first embodiment is used as a negative electrode active material, the composite oxide represented by the general formula $Li_xFe_{1-y}M1_yNb_{11-z}M2_zO_{29}$ ($0 \leq x \leq 23$, $0 \leq y \leq 1$, $0 < z \leq 6$) does not theoretically contain lithium in a fully discharged state. In reality, however, in the composite oxide represented by the above general formula, lithium may remain even in a discharged state. The active material according to the first embodiment can realize a secondary battery capable of exhibiting high capacity and excellent rate performance even if lithium remains.

Figure 2:
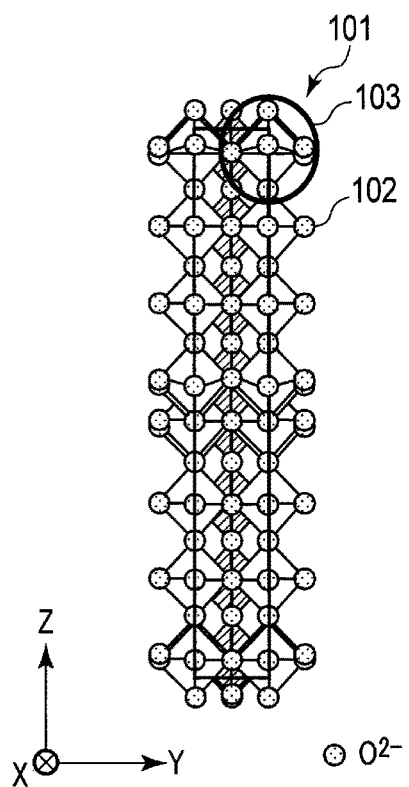
FIG. 2 is a schematic diagram of the crystal structure of FIG. 1 as viewed from another direction.

FIG. 1 is a diagram schematically showing the crystal structure of orthorhombic $Fe_{0.9}Ti_{0.1}Nb_{10.9}Sn_{0.1}O_{29}$ included in an active material according to the embodiment. FIG. 1 shows a case where the crystal structure is viewed from the Y direction. FIG. 2 shows a case where the crystal structure is viewed from the X direction. Note that the X direction and the Y direction are directions orthogonal to each other. The Z direction is a direction perpendicular to the X direction and the Y direction.

As shown in FIGS. 1 and 2, a crystal structure 101 of the orthorhombic composite oxide $Fe_{0.9}Ti_{0.1}Nb_{10.9}Sn_{0.1}O_{29}$ has a structure in which metal ions (not shown) and oxide ions 102 constitute a skeletal structure portion 103. Note that Fe ions, Ti ions, Nb ions, and Sn ions are randomly arranged at the positions of metal ions at the ratio of Fe:Ti:Nb:Sn=0.9:0.1:10.9:0.1. In the crystal structure 101, the skeletal structure portion 103 is arranged three-dimensionally and alternately. Accordingly, in the crystal structure 101, a vacancy portion 104 exists between the skeletal structure portions 103. The vacancy portion 104 can play host to lithium ions. As shown in FIGS. 1 and 2, the vacancy portion 104 can occupy a substantially uniform mesh shape with respect to the crystal structure 101 as a whole. In addition, the vacancy portion 104 can maintain its structure in a stable manner even if lithium ions are inserted.

In FIG. 1, a region 105 and a region 106 are portions having three-dimensional vacancy channels capable of allowing lithium ions to be diffused. The vacancy portion has a tunnel structure favorable for conducting lithium ions. Lithium ions can move between the region 105 and the region 106. Therefore, the orthorhombic $Fe_{0.9}Ti_{0.1}Nb_{10.9}Sn_{0.1}O_{29}$ enables three-dimensional diffusion of lithium in the crystal structure 101.

Therefore, the crystal structure 101 of the orthorhombic $Fe_{0.9}Ti_{0.1}Nb_{10.9}Sn_{0.1}O_{29}$ having a three-dimensional tunnel structure has a large equivalent insertion space of lithium ions and is structurally stable. Further, the orthorhombic $Fe_{0.9}Ti_{0.1}Nb_{10.9}Sn_{0.1}O_{29}$ has three-dimensional channels that allows lithium ions to be easily diffused in the crystal structure 101 as described above, whereby the insertion/extraction property of lithium ions into/from a vacancy as a lithium host is improved and also, the insertion/extraction space of lithium ions is effectively increased. By including such a composite oxide, the active material according to the first embodiment can provide a secondary battery capable of exhibiting high capacity and excellent rate performance.

The crystal structure 101 shown in FIGS. 1 and 2 has a crystal system of a space group represented by a space group Amma (No. 63) described in International tables for crystallography.

Further, in the orthorhombic composite oxide represented by the general formula $Li_xFe_{1-y}M1_yNb_{11-z}M2_zO_{29}$ ($0 \le x \le 23$, $0 \le y \le 1$, $0 < z \le 6$) contained in the active material according to the present embodiment, an M1 site and an M2 site can independently contain Mg, Cu and Zn that are divalent, transition metals Fe, Co, Mn and Ni that are trivalent, Sn and Ti that are tetravalent, and Nb, Ta, and V that are pentavalent, and Mo that is hexavalent. As will be described below, this is another reason why the active material according to the present embodiment can realize a secondary battery capable of exhibiting high energy densities.

With reference again to FIGS. 1 and 2, a description will be given by taking the orthorhombic composite oxide $Fe_{0.9}Ti_{0.1}Nb_{10.9}Sn_{0.1}O_{29}$ as an example. In the orthorhombic $Fe_{0.9}Ti_{0.1}Nb_{10.9}Sn_{0.1}O_{29}$, when lithium ions having a monovalent positive charge are inserted into the vacancy portion 104, metal ions (not shown) constituting the skeleton are reduced by one valence number, thereby maintaining the electrical neutrality of the crystal. In the orthorhombic $Fe_{0.9}Ti_{0.1}Nb_{10.9}Sn_{0.1}O_{29}$, the pentavalent cation is also reduced from pentavalent to trivalent. Trivalent cations can also be reduced from trivalent to divalent. For this reason, the orthorhombic $Fe_{0.9}Ti_{0.1}Nb_{10.9}Sn_{0.1}O_{29}$ containing Nb, which is a pentavalent cation, has a larger reduction valence number per weight of the active material than the compound containing only the tetravalent cation. Therefore, the orthorhombic $Fe_{0.9}Ti_{0.1}Nb_{10.9}Sn_{0.1}O_{29}$ can maintain the electrical neutrality of the crystal even if many lithium ions are inserted. For this reason, compared with compounds such as titanium oxide containing only tetravalent cations, the orthorhombic $Fe_{0.9}Ti_{0.1}Nb_{10.9}Sn_{0.1}O_{29}$ can increase the energy densities.

The orthorhombic composite oxide represented by the general formula $Li_xFe_{1-y}M1_yNb_{11-z}M2_zO_{29}$ ($0 \le y \le 1$, $0 < z \le 6$) has a maximum of eleven pentavalent cations and one trivalent cation. Therefore, in the orthorhombic composite oxide represented by the general formula $Li_xFe_{1-y}M1_yNb_{11-z}M2_zO_{29}$ ($0 \le y \le 1$, $0 < z \le 6$), theoretically, a maximum of 23 lithium ions can be inserted into the unit cell. Therefore, the orthorhombic composite oxide contained in the active material according to the present embodiment can be represented by the general formula $Li_xFe_{1-y}M1_yNb_{11-z}M2_zO_{29}$, and the subscript x can take a value in the range from 0 to 23 depending on the charge/discharge state. The subscript x can take a numerical range of $0 < x \le 23$ when the orthorhombic composite oxide is charged even once. Alternatively, as will be described below, when synthesizing the orthorhombic composite oxide, a Li source such as lithium carbonate may be used as a starting material to synthesize. In that case, since the orthorhombic composite oxide obtained after synthesis contains Li, the subscript x can take a numerical range of $0 < x \le 23$.

The orthorhombic composite oxide represented by the general formula $Li_xFe_{1-y}M1_yNb_{11-z}M2_zO_{29}$ can be represented as the general formula $Li_xFe_{1-y}M1_yNb_{11-z}M2_zO_{29+\delta}$ ($0 \le x \le 23$, $0 \le y \le 1$, $0 < z \le 6$, $-0.3 \le \delta \le +0.3$).

The subscript $\delta$ represents a change in the valence of the Fe and M1 elements and a change in the valence of the Nb and M2 elements in the orthorhombic composite oxide $Li_xFe_{1-y}M1_yNb_{11-z}M2_zO_{29}$, and a deviation of the stoichiometric ratio in $Li_xFe_{1-y}M1_yNb_{11-z}M2_zO_{29}$ caused by the above changes. The subscript $\delta$ can vary depending on the reduction state of the orthorhombic composite oxide. In the orthorhombic composite oxide represented by the general formula $Li_xFe_{1-y}M1_yNb_{11-z}M2_zO_{29}$ in which the subscript $\delta$ is less than $-0.3$, the constituent element Nb and reducible elements are in an excessively reduced state. When such an orthorhombic composite oxide is used in a secondary battery, the electrode capacity is extremely lowered and a secondary battery exhibiting high capacity cannot be realized. On the other hand, up to $\delta = +0.3$ can be considered as within the measurement error range caused by the influence of adsorbed oxygen or moisture on the surface.

As described above, in the orthorhombic composite oxide represented by the general formula $Li_xFe_{1-y}M1_yNb_{11-z}M2_zO_{29}$, the valence number of Fe, the M1 element, Nb, and the M2 element can be changed by the change in the reduction state. However, since the subscript $\delta$ takes a value within the range of $-0.3 \le \delta \le +0.3$, the average valence number of Nb and the pentavalent constituent element (element M2) is 4.95 or more in the orthorhombic composite oxide represented by the general formula $Li_xFe_{1-y}M1_yNb_{11-z}M2_zO_{29}$ included in the active material according to the embodiment.

The average valence number of Nb and the pentavalent constituent elements in the orthorhombic composite oxide $Li_xFe_{1-y}M1_yNb_{11-z}M2_zO_{29}$ greatly depends on the manufacturing method of the orthorhombic composite oxide. More specifically, the orthorhombic composite oxide in which the average valence number of Nb and the pentavalent constituent element is 4.95 or more can be manufactured by preventing the reduction of Nb and the pentavalent constituent element by firing during manufacture in an oxygen atmosphere or processing that restores oxygen deficiency after firing, for example, a manufacturing method including annealing. Details of the manufacturing method will be described below.

As described above, when lithium is inserted into the orthorhombic composite oxide represented by the general formula $Li_xFe_{1-y}M1_yNb_{11-z}M2_zO_{29}$, Nb and the pentavalent constituent element are reduced. Therefore, the measured average valence number of Nb and the pentavalent constituent element in the orthorhombic composite oxide in a state in which lithium is inserted, that is, represented by the general formula $Li_xFe_{1-y}M1_yNb_{11-z}M2_zO_{29}$ ($0 \le x \le 23$, $0 \le y \le 1$, $0 < z \le 6$) and contained in the active material according to the embodiment may be smaller than 4.95.

In the general formula $Li_xFe_{1-y}M1_yNb_{11-z}M2_zO_{29}$ ($0 \le x \le 23$, $0 \le y \le 1$, $0 < z \le 6$) (1), as described above, the subscript x changes within the range of $0 \le x \le 23$ depending on the charge/discharge state.

In the above general formula (1), M1 and M2 independently contain at least one element selected from a group consisting of Mg, Al, Cu, Mn, Co, Ni, Zn, Sn, Ti, Ta, V, and Mo.

The element M2 contains elements having different valence numbers, whereby the coordination state of oxide ions in the crystal lattice can be changed. Accordingly, the position of the Li ion is stabilized so that the rate performance, particularly the low-temperature rate performance can be enhanced. The same is true for the element M1. The element M1 contains elements having different valence numbers, whereby the coordination state of oxide ions in the crystal lattice can be changed. However, the interaction between Fe and oxide ions is smaller than the interaction between Nb and oxide ions. Therefore, when the element M2 contains elements having mutually different valence numbers contributes more to the effect of improving the low-temperature rate than when the element M1 contains elements having mutually different valence numbers.

M1 and/or M2 can realize high rate performance by containing at least one element selected from a group consisting of Cu, Mn, Co, and Ni. This is because Cu, Mn, Co and Ni are transition elements.

Also, M1 and/or M2 can realize high rate performance by containing Mg. This is because the ionic radius of Mg is large, which contributes to enlargement of the crystal lattice and the diffusibility of Li is increased.

Also, M1 and/or M2 can realize high rate performance by including at least one element selected from a group consisting of Al and Zn. This is because Al and Zn increase the covalency with oxide ions, whereby the position of Li is more likely to be stabilized. As a result, the diffusibility of Li increases.

Also, M1 and/or M2 can realize high rate performance by including at least one element selected from a group consisting of Ta, V, and Mo. This is because Ta, V, and Mo have a strong electron correlation with oxide ions and thus, the electron correlation between lithium ions and oxide ions is weakened and lithium ions in the crystal are made easier to move.

M1 and/or M2 preferably contain Ti. Also, M1 and/or M2 can realize high rate performance by including Ti to contribute to oxidation-reduction when Li is inserted into the active material. Further, because Ti has an oxidation-reduction potential equal to that of Nb, there is an effect that the slope of a charge/discharge curve becomes continuous. Further, Ti has an ionic radius close to that of other constituent elements and thus, an Fe site and a Nb site can be substituted at the same time. Therefore, the effect of stabilizing the position of Li is great.

As another aspect, it is also preferable that M1 and/or M2 include at least one element selected from a group consisting of Ti, V, and Sn. Because Ti, V, and Sn contribute to oxidation-reduction by charge and discharge, high energy densities can be realized.

In the above general formula (1), the subscript y takes the value in the range of $0 \leq y \leq 1$. The subscript y is preferably in the range of $0<y \leq 1$, more preferably in the range of $0.01 \leq y \leq 0.7$, and still more preferably in the range of $0.01 \leq y \leq 0.3$. By substituting a portion of Fe sites with a dopant, the electronic correlation between metal ions and oxide ions is changed locally in the substituted portion from non-substituted portions. Accordingly, the position at which the Li ion coordinates in the crystal structure is easily settled and the rate performance, especially the low-temperature rate performance is improved.

In the above general formula (1), the subscript z takes the value in the range of $0<z \leq 6$. The subscript z is preferably in the range of $0<z \leq 3.0$, more preferably in the range of $0.01 \leq z \leq 3.0$, and still more preferably in the range of $0.01 \leq z \leq 2.0$. Most preferably, by substituting a portion of Nb sites with a dopant, the electron correlation with the oxide ion changes locally in the substituted portion. Accordingly, the position at which the Li ion coordinates in the crystal structure is easily settled and the rate performance, especially the low-temperature rate performance is improved. However, if the Nb site is substituted in an amount in which z exceeds 6, a crystalline phase different from the crystalline phase represented by the general formula (1) becomes stable so that it becomes difficult to obtain the crystalline phase represented by the above general formula (1) as a single phase.

A lithium niobium composite oxide represented by the general formula $Li_xFe_{1-y}M1_yNb_{11-z}M2_zO_{29}$ (1) and having an orthorhombic crystal structure can also be referred to as a metal-substituted lithium niobium composite oxide.

The active material according to the embodiment is represented by the orthorhombic composite oxide $Li_xFe_{1-y}M1_yNb_{11-z}M2_zO_{29}$ ($0 \leq x \leq 23$, $0 \leq y \leq 1$, $0<z \leq 6$) and it is preferable to further include, in addition to the lithium niobium composite oxide having an orthorhombic crystal structure, at least one oxide selected from a group consisting of an oxide of the constituent elements M1 and M2, $Nb_2O_5$, and $TiO_2$. Accordingly, the orthorhombic composite oxide $Li_xFe_{1-y}M1_yNb_{11-z}M2_zO_{29}$ is preferably in a state coexisting in the crystal lattice with at least one oxide selected from a group consisting of an oxide of the constituent elements M1 and M2, $Nb_2O_5$, and $TiO_2$. $TiO_2$ having an anatase structure is particularly preferable as the above oxide. Anatase $TiO_2$ has a property of being able to impart high electron conductivity when lithium ions are inserted. Therefore, the active material according to the embodiment further including anatase $TiO_2$ can easily form an electronically conductive network in an electrode when used in the electrode. As a result, the active material according to the embodiment further including the anatase $TiO_2$ can realize a secondary battery further improved in excellent quick charge/discharge performance and high energy density.

Next, the form of the active material according to the embodiment, the particle size and the specific surface area will be described.

<Morphology>

The form of the active material according to the embodiment is not particularly limited. The lithium niobium composite oxide represented by the general formula $Li_xFe_{1-y}M1_yNb_{11-z}M2_zO_{29}$ can take the form of, for example, primary particles or secondary particles formed by aggregation of primary particles. Particles of the lithium niobium composite oxide may be a mixture of primary particles and secondary particles.

Carbon may adhere to the surface of particles of the lithium niobium composite oxide. Carbon may adhere to the surface of primary particles or to the surface of secondary particles. Alternatively, particles of the lithium niobium composite oxide may contain secondary particles formed by primary particles having carbon attached to the surface thereof being aggregated. Such secondary particles can exhibit excellent conductivity because carbon is present between primary particles. An aspect that contains such secondary particles is preferable because the electrode active material-containing layer can exhibit still lower resistance.

<Particle Size>

An average particle size of the active material according to the embodiment is not particularly limited and may be changed according to desired battery characteristics. The average particle size of the orthorhombic composite oxide represented by the general formula $Li_xFe_{1-y}M1_yNb_{11-z}M2_zO_{29}$ is, for example, in the range of 0.5 µm to 5.0 µm. The average particle size can be determined by, for example, laser diffraction.

<BET Specific Surface Area>

The BET (Brunauer, Emmett, Teller) specific surface area of the active material according to the embodiment is not particularly limited. However, the BET specific surface area is preferably 5 m²/g or more and less than 200 m²/g.

If the specific surface area is 5 m²/g or more, a contact area with the electrolyte can be secured, favorable discharge rate characteristics can be easily obtained, and the charging time can be shortened. If the specific surface area is less than 200 m²/g, on the other hand, reactivity with the electrolyte does not become too high so that the life performance can be improved. Further, coating properties of a slurry used in the production of an electrode described below and including the active material can be made favorable.

Here, for the measurement of the specific surface area, a method is used by which molecules, in which an occupied area in adsorption is known, are adsorbed onto the surface of powder particles at a temperature of liquid nitrogen and the specific surface area of the sample is determined from the amount of adsorbed molecules. The most commonly used is the BET method based on low-temperature and low-humidity physical adsorption of an inert gas, which is the most famous theory as a method of calculating the specific surface area by extending the Langmuir theory, which is monomolecular layer adsorption theory to multimolecular layer adsorption. The specific surface area determined by the above method is referred to as a "BET specific surface area".

<Manufacturing Method>

The active material according to the present embodiment may be produced by, for example, the following method.

First, starting materials are mixed. An oxide or a salt containing Fe, Nb is used as a starting material for the orthorhombic composite oxide represented by the general formula $Li_xFe_{1-y}M1_yNb_{11-z}M2_zO_{29}$. Further, as an M1 source and an M2 source, an oxide or a salt containing at least one element selected from a group consisting of Mg, Al, Cu, Mn, Co, Ni, Zn, Sn, Ti, Ta, V and Mo contained in the target composition is used. The salt used as a starting material is preferably a salt like carbonates and nitrates that decomposes at a relatively low temperature to produce oxide.

The starting materials are mixed at an element ratio such that the target composition is obtained. Then, the resultant mixture is ground to obtain a mixture as homogeneous as possible. Subsequently, the resultant mixture is fired. The firing process includes a pre-firing process performed within a temperature range of 650° C. to 800° C. and a main firing process performed within a temperature range of 1100° C. to 1250° C.

The pre-firing process and the main firing process are performed in this order. The firing process may further include another firing process performed after the main firing. The firing process is performed for a total of 10 to 40 hours. After firing, the fired product is swiftly taken out from the electric furnace and cooled to room temperature. Preferably, the fired product is cooled under the condition that the temperature of the fired product falls to 100° C. or less within one hour from the firing temperature. In this way, the orthorhombic composite oxide represented by the general formula $Li_xFe_{1-y}M1_yNb_{11-z}M2_zO_{29}$ can be obtained.

In the orthorhombic composite oxide obtained by the above operation, Nb and the element M2 may have been reduced in advance. As a result, crystallinity may be low. Therefore, it is preferable to further perform annealing treatment on the obtained orthorhombic composite oxide at a temperature equal to or lower than the above-mentioned main firing temperature. Oxygen deficiency can be recovered by performing annealing treatment so that an orthorhombic composite oxide whose average valence number of Nb and the element M2 is 4.95 or more can be obtained. The annealing treatment is performed by heat treatment at a temperature of 600° C. to 800° C. for one hour to 5 hours. After the annealing treatment, the fired product is swiftly taken out from the electric furnace and cooled to room temperature. In this way, the active material containing the target orthorhombic composite oxide can be obtained.

Incidentally, lithium ions may be inserted into the orthorhombic composite oxide synthesized by the above method by charging a battery. Alternatively, the orthorhombic composite oxide may be synthesized as a composite oxide containing lithium by using a compound containing lithium such as lithium carbonate as Li source for a starting material.

<Method of Measuring Active Material>

(Preprocessing)

When a target active material to be measured is included in an electrode material of a secondary battery, a pretreatment is performed as described below.

First, to grasp a crystalline state of the active material, a state in which lithium ions are completely extracted from the active material is created. For example, when the active material is used in the negative electrode, the battery is fully discharged. For example, the discharged state of the battery can be achieved by repeating a plurality of times a discharging of the battery in a 25° C. environment at 0.1 C current to a rated end voltage or to a battery voltage of 1.0 V so that the current value during discharge is $1/100$ of the rated capacity or less. Though there may be residual lithium ions even in the discharged state, there is no significant effect on the results of each measurement below.

Next, the battery is disassembled in a dry atmosphere, such as that in a glove box filled with argon, and the electrode is taken out. The taken-out electrode is washed with an appropriate solvent and dried under reduced pressure. For example, ethyl methyl carbonate may be used for washing. After washing and drying, whether or not there are white precipitates such as a lithium salt on the surface is examined.

The washed electrode is processed or treated into a measurement sample as appropriate, depending on the measurement method to be subjected to. For example, in the case of subjecting to the powder X-ray diffraction measurement, the washed electrode is cut into a size having the same area as that of a holder of the powder X-ray diffraction apparatus, and used as a measurement sample.

When necessary, the active material is extracted from the electrode to be used as a measurement sample. For example, when subjected to a composition analysis, as will be described below, the active material is taken out from the washed electrode and the taken-out active material is analyzed.

(Powder X-Ray Diffraction Measurement)

The crystal structure of a compound contained in the active material can be checked by powder X-ray diffraction measurement (XRD) of the active material.

The powder X-ray diffraction measurement of an active material is made as described below.

First, the target sample is ground until an average particle size becomes about 5 μm. The average particle size can be determined by, for example laser diffraction. The ground sample is filled in a holder part having a depth of 0.2 mm, formed on a glass sample plate. As the glass sample plate, for example, a glass sample plate manufactured by Rigaku Corporation is used. At this time, care should be taken to fill the holder part sufficiently with the sample. Precaution should be taken to avoid cracking and formation of voids caused by insufficient filling of the sample. Then, another glass plate is used to smoothen the surface of the sample by sufficiently pressing the glass plate against the sample. In this case, precaution should be taken to avoid too much or too little a filling amount, so as to prevent any rises and dents in the basic plane of the glass holder.

Next, the glass plate filled with the sample is set in a powder X-ray diffractometer, and a diffraction pattern (XRD pattern; X-Ray Diffraction pattern) is obtained using Cu-Kα rays.

When the active material to be measured is contained in the electrode material of a secondary battery, firstly, the electrode after cleaning and drying is prepared according to the procedure described above. Then, the electrode is cut to be of an area about equal to the area of the holder of a powder X-ray diffractometer and used as a measurement sample. The measurement sample obtained in this way is affixed directly to the glass holder and measured.

Upon which, the position of the peak originating from the electrode substrate such as a metal foil is measured in advance. The peaks of other components such as an electroconductive agent and a binder are also measured in advance. In such a case that the peaks of the substrate and active material overlap with each other, it is desirable that the layer including the active material (e.g., the later-described active material-containing layer) is separated from the substrate, and subjected to measurement. This is in order to separate the overlapping peaks when quantitatively measuring the peak intensity. For example, the active material-containing layer can be separated by irradiating the electrode substrate with an ultrasonic wave in a solvent.

When the sample has a high degree of orientation, the peak position may be shifted or the peak intensity ratio may change, depending on how the sample is loaded. A sample having such a remarkably high degree of orientation is measured using a capillary. More specifically, the sample is inserted into a capillary and the capillary is mounted on a rotary sample stage for measurement. By using such a measuring method, orientation can be relaxed.

Such a sample having a high orientation is measured in the form of pellets. The pellet may be a pressed powder having a diameter of 10 mm and a thickness of 2 mm, for example. The pressed powder may be produced by applying a pressure of about 250 MPa to the sample for 15 minutes. The obtained pellet is mounted on an X-ray diffractometer to measure the surface of the pellet. The measurement using such a method can exclude the difference in measuring result between operators to thereby improve reproducibility.

When an intensity ratio measured by this method is different from an intensity ratio measured using the flat plate holder or glass holder described above, the influence due to the orientation is considerable, such that measurement results using the pellets are adopted.

As an apparatus for powder X-ray diffraction measurement, SmartLab manufactured by Rigaku is used, for example. Measurement is performed under the following condition:
X-ray source: Cu target
Output: 45 kV, 200 mA
soller slit: 5 degrees in both incident light and received light
step width (2θ): 0.02 deg
scan speed: 20 deg/min
semiconductor detector: D/teX Ultra 250
measurement range: $5° \leq 2\theta \leq 90°$
sample plate holder: flat glass sample plate holder (0.5 mm thick)

When another apparatus is used, in order to obtain measurement results equivalent to those described above, measurement using a standard Si powder for powder X-ray diffraction is performed, and measurement is conducted with conditions adjusted such that a peak intensity and a peak top position correspond to those obtained using the above apparatus.

Conditions of the above powder X-ray diffraction measurement is set, such that an XRD pattern applicable to Rietveld analysis is obtained. In order to collect data for Rietveld analysis, specifically, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model estimated in advance. The parameters of the crystal structure (lattice constant, atomic coordinates, crystal site occupancy ratio and the like) can be precisely analyzed by fitting all calculated values and measured values. Accordingly, characteristics of the crystal structure of the compounds contained in the active material to be measured can be investigated. Further, according to the powder X-ray diffraction measurement described above, a multiphase coexistence state in which, in addition to the orthorhombic composite oxide $Li_xFe_{1-y}M1_yNb_{11-z}M2_zO_{29}$, an oxide containing constituent elements such as Fe, Nb, the element M1, and the element M2, and a compound having another crystal structure such as $TiO_2$ or the like coexist can be investigated.

Further, when active material particles contain a plurality of kinds of active materials, TEM-EELS combining transmission electron microscopy (TEM) with electron energy-loss spectroscopy (EELS) is performed. By subjecting target active material particles to electron beam diffraction, phases can be identified from their respective crystal structures.

(Measurement of Average Valence Number of Nb and the Element M2 and Checking of Composition of the Active Material)

In order to know the average valence number of Nb and the element M2 quantitatively, the following method can be used for investigation. First, an active material in a state in which Li is completely extracted according to the above description is prepared, and the active material is subjected to vacuum drying at 140° C. for 24 hours. Next, the total weight of the active material is measured in a dry atmosphere. The active material is dissolved in acid and quantitative analysis of constituent elements is carried out by inductively coupled plasma atomic emission spectroscopy (ICP analysis). Assuming that all the constituent elements obtained by quantitative analysis take ideal valence numbers and the reduction amount is 0, the amount of oxygen when all the obtained constituent elements exist as oxides is calculated. If the total weight of the oxygen amount and the constituent element amount obtained by the analysis is heavier than the actually measured weight, this means that the constituent elements are reduced by the weight difference. Through these analyzes, the average valence number of Nb and the element M2 can be quantitatively measured. In addition, the composition of the active material is determined by ICP analysis.

In order to check quantitatively whether or not Nb and the element M2 in the crystal structure are reduced, the X-ray absorption fine structure (XAFS) analysis can be applied to investigate the average valence number of Nb and the element M2 of the active material in the active material containing layer. Alternatively, the average valence number of Nb and the element M2 can be investigated by the above EELS measurement.

The reduction amount of Nb and the element M2 is measured according to the above-described method. However, as described above, for a sample which has been subjected to charge and discharge as a battery, an electrode sufficiently discharged, that is, from which Li is sufficiently extracted is used. The absence of residual Li in the active material is checked by using inductively coupled plasma emission spectroscopy. When there is residual Li, it is necessary to correct the reduction amount of Nb and the element M2. More specifically, by assuming that Nb and the element M2 have been reduced by Li remaining in the crystal, the average valence number of Nb and the element M2 before charge and discharge can be determined by adding the valence number corresponding to the Li amount calculated from a quantitative value of the ICP analysis to the average valence number of Nb and the element M2. If the average valence number is less than 5, this means that Nb and/or pentavalent constituent elements are reduced and if the average valence number is 5, this reveals that Nb and the element M2 contained in the active material are in an ideal state.

When carbon or the like adhere to the surface of active material particles, it is necessary to burn off carbon by firing the active material at 900° C. in the atmosphere and to calculate the carbon adhesion amount from the weight difference before and after firing.

(Examination of Presence or Absence of Carbon Material on Particle Surface)

Whether or not the carbon material is provided on the particle surface of the niobium-titanium composite oxide may be examined as follows.

First, according to the procedure described above, an electrode containing the active material to be measured is taken out from a secondary battery and washed.

An active material powder is taken out from the washed electrode. The active material powder may be taken out as follows, for example. First, an electrode containing a binder is dispersed in a solvent. As the solvent to be used in this case, for example, N-methylpyrrolidone is used if the binder is an organic solvent binder, and pure water is used if the binder is an aqueous binder (for example, a water-soluble binder). The solvent is irradiated with ultrasonic waves for 30 minutes or more to disperse the electrode. As a result, the binder becomes dissolved, and an electrode material may be separated as a powder from a current collector. Then, a solvent containing the powder of the electrode material is placed in a centrifuge, separated into an electro-conductive agent and active material particles, and then recovered by freeze drying. Thus, the active material powder may be taken out while maintaining the carbon material provided on the particle surface.

The taken out active material is washed with an organic solvent such as a diethyl carbonate solvent to dissolve and remove a lithium salt and then dried. After drying, the active material, which has been thoroughly washed with water in air to remove residual lithium ions, is used as a measurement subject.

The carbon material on the particle surface may be analyzed by the following inorganic element analysis. An active material sample prepared as a measurement target is placed in an alumina crucible together with a combustion improver and burned by high frequency induction heating in an oxygen stream. At this time, since carbon is released as carbon dioxide, a carbon content is quantified by detecting carbon dioxide with an infrared detector. As a measuring apparatus, for example, a Model No. CS 844 manufactured by Leco Corporation may be used.

According to the first embodiment, an active material is provided. The active material includes a lithium niobium composite oxide represented by a general formula $Li_xFe_{1-y}M1_yNb_{11-z}M2_zO_{29}$ (1) and having an orthorhombic crystal structure. In the general formula (1), $0 \leq x \leq 23$, $0 \leq y \leq 1$, and $0 < z \leq 6$ are satisfied. Each of M1 and M2 independently contain at least one element selected from a group consisting of Fe, Mg, Al, Cu, Mn, Co, Ni, Zn, Sn, Ti, Ta, V, and Mo. The active material can realize a secondary battery capable of exhibiting excellent low-temperature rate performance and high energy densities.

Second Embodiment

According to the second embodiment, an electrode is provided.

The electrode according to the second embodiment contains the active material according to the first embodiment. This electrode may be a battery electrode containing the active material according to the first embodiment as an active material for a battery. The electrode as a battery electrode may be, for example, a negative electrode containing the active material according to the first embodiment as a negative electrode active material.

The electrode according to the second embodiment may include a current collector and an active material-containing layer. The active material-containing layer may be formed on both of reverse surfaces or one surface of the current collector. The active material-containing layer may contain the active material, and optionally an electro-conductive agent and a binder.

The active material-containing layer may singly include the active material according to the first embodiment or include two or more kinds of the active material according to the first embodiment. Furthermore, a mixture where one kind or two or more kinds of the active material according to the first embodiment is further mixed with one kind or two or more kinds of another active material may also be included.

For example, in a case where the active material according to the first embodiment is included as the negative electrode active material, examples of other active materials include lithium titanate having a ramsdellite structure (e.g., $Li_{2+y}Ti_3O_7$, $0 < y \leq 3$), lithium titanate having a spinel structure (e.g., $Li_{4+x}Ti_5O_{12}$, $0 < x \leq 3$), monoclinic titanium dioxide ($TiO_2$), anatase type titanium dioxide, rutile type titanium dioxide, a hollandite type titanium composite oxide, an orthorhombic titanium-containing composite oxide, and a monoclinic niobium titanium composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

Examples of the monoclinic niobium titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0 \leq x \leq 5$, $0 \leq y \leq 1$, $0 \leq z < 2$, and $-0.3 \leq \delta \leq 0.3$. Specific examples of the monoclinic niobium titanium composite oxide include $Li_xNb_2TiO_7$ ($0 \leq x \leq 5$).

Another example of the monoclinic niobium titanium composite oxide is a compound represented by $Ti_{1-y}M3_{y+z}Nb_{2-z}O_{7-\delta}$. Here, M3 is at least one selected from Mg, Fe, Ni, Co, W, Ta, and Mo. The respective subscripts in the composition formula are specified as follows: $0 \leq y < 1$, $0 \leq z \leq 2$, and $-0.3 \leq \delta \leq 0.3$.

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or two or more may be used in combination as the binder.

The blending proportion of active material, electro-conductive agent and binder in the active material-containing layer may be appropriately changed according to the use of the electrode. For example, in the case of using the electrode as a negative electrode of a secondary battery, the active material (negative electrode active material), electro-conductive agent and binder in the active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

There may be used for the current collector, a material which is electrochemically stable at the potential (vs. $Li/Li^+$) at which lithium (Li) is inserted into and extracted from active material. For example in the case where the active material is used as a negative electrode active material, the current collector is preferably made of copper, nickel, stainless steel, aluminum, or an aluminum alloy including one or more elements selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the electrode.

The current collector may include a portion where the active material-containing layer is not formed on a surface of the current collector. This portion may serve as an electrode tab.

The electrode may be produced by the following method, for example. First, active material, electro-conductive agent, and binder are suspended in a solvent to prepare a slurry. The slurry is applied onto one surface or both of reverse surfaces of a current collector. Next, the applied slurry is dried to form a layered stack of active material-containing layer and current collector. Then, the layered stack is subjected to pressing. The electrode can be produced in this manner.

Alternatively, the electrode may also be produced by the following method. First, active material, electro-conductive agent, and binder are mixed to obtain a mixture. Next, the mixture is formed into pellets. Then the electrode can be obtained by arranging the pellets on the current collector.

The electrode according to the second embodiment includes the active material according to the first embodiment. Therefore, the electrode can realize a secondary battery capable of exhibiting excellent quick charge/discharge performance and high energy densities.

Third Embodiment

According to a third embodiment, there is provided a secondary battery including a negative electrode, a positive electrode, and an electrolyte. As the negative electrode, the secondary battery includes the electrode according to the second embodiment. That is, the secondary battery according to the third embodiment includes as the negative electrode, an electrode that includes the active material according to the first embodiment as a battery active material.

The secondary battery according to the third embodiment may further include a separator provided between the positive electrode and the negative electrode. The negative electrode, the positive electrode, and the separator can structure an electrode group. The electrolyte may be held in the electrode group.

The secondary battery according to the third embodiment may further include a container member that houses the electrode group and the electrolyte.

The secondary battery according to the third embodiment may further include a negative electrode terminal electrically connected to the negative electrode and a positive electrode terminal electrically connected to the positive electrode.

The secondary battery according to the third embodiment may be, for example, a lithium ion secondary battery. The secondary battery also includes nonaqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

(1) Negative Electrode

The negative electrode may include a negative electrode current collector and a negative electrode active material-containing layer. The negative electrode current collector and the negative electrode active material-containing layer may be respectively a current collector and an active material-containing layer that may be included in the electrode according to the second embodiment. The negative electrode active material-containing layer contains the active material according to the first embodiment as a negative electrode active material.

Of the details of the negative electrode, parts overlapping with the details described in the second embodiment are omitted.

The density of the negative electrode active material-containing layer (excluding the current collector) is preferably from 1.8 $g/cm^3$ to 3.5 $g/cm^3$. The negative electrode, in which the density of the negative electrode active material-containing layer is within this range, is excellent in energy density and ability to hold the electrolyte. The density of the negative electrode active material-containing layer is more preferably from 2.5 $g/cm^3$ to 2.9 $g/cm^3$.

The negative electrode may be produced by a method similar to that for the electrode according to the second embodiment, for example.

(2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one kind of compound as the positive electrode active material, or alternatively, include two or more kinds of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z\leq1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later. The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably from 0.1 m²/g to 10 m²/g. The positive electrode active material having a specific surface area of 0.1 m²/g or more can secure sufficient sites for inserting and extracting Li ions. The positive electrode active material having a specific surface area of 10 m²/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carboxymethyl cellulose (CMC), and salts of CMC. One of these may be used as the binder, or two or more may be used in combination as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, the decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of the positive electrode current collector. This portion may serve as a positive electrode tab.

The positive electrode may be produced by a method similar to that for the electrode according to the second embodiment, for example, using a positive electrode active material.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate (LiPFG), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

(4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the third embodiment will be more specifically described with reference to the drawings.

FIG. 3 is a cross-sectional view schematically showing an example of a secondary battery according to the third embodiment. FIG. 4 is an enlarged cross-sectional view of section A of the secondary battery shown in FIG. 3.

The secondary battery 100 shown in FIGS. 3 and 4 includes a bag-shaped container member 2 shown in FIG. 3, an electrode group 1 shown in FIGS. 3 and 4, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 3, the electrode group 1 is a wound electrode group in a flat form. The wound electrode group 1 in a flat form includes a negative electrode 3, a separator 4, and a positive electrode 5, as shown in FIG. 4. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 4. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 3, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 5:
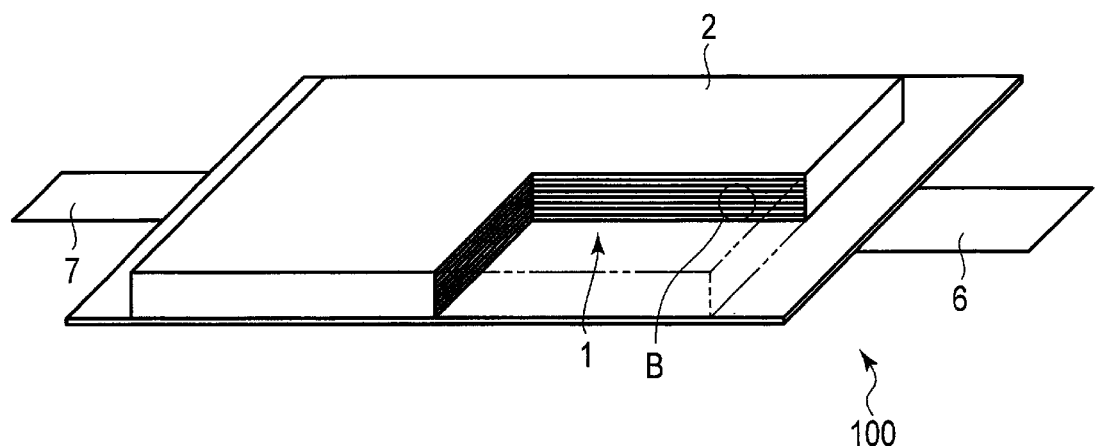
FIG. 5 is a partially cut-out perspective view schematically showing another example of the secondary battery according to the embodiment.
Figure 6:
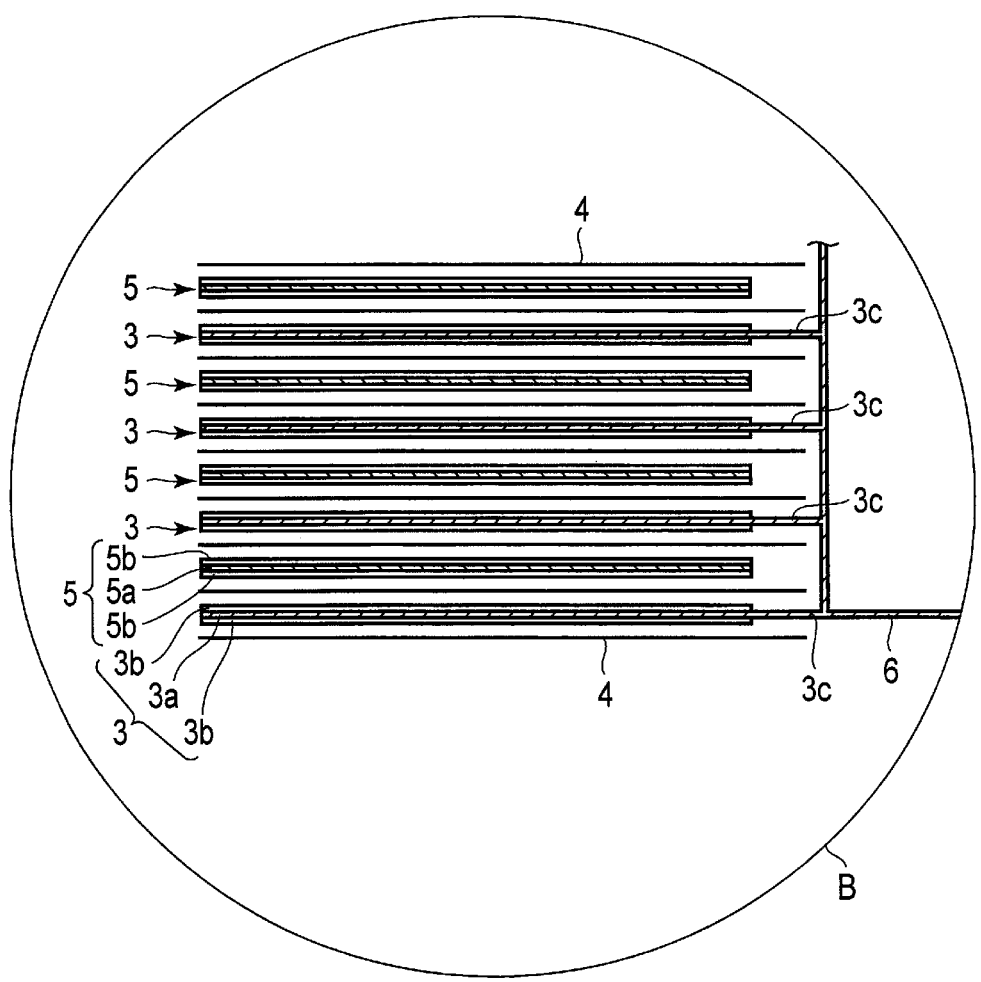
FIG. 6 is an enlarged cross-sectional view of section B of the secondary battery shown in FIG. 5.

The secondary battery according to the third embodiment is not limited to the secondary battery of the structure shown in FIGS. 3 and 4, and may be, for example, a battery of a structure as shown in FIGS. 5 and 6.

FIG. 5 is a partially cut-out perspective view schematically showing another example of a secondary battery according to the third embodiment. FIG. 6 is an enlarged cross-sectional view of section B of the secondary battery shown in FIG. 5.

The secondary battery 100 shown in FIGS. 5 and 6 includes an electrode group 1 shown in FIGS. 5 and 6, a container member 2 shown in FIG. 5, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 6, the electrode group 1 is a stacked electrode group. The stacked electrode group 1 has a structure in which and negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 6, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the third embodiment includes the active material according to the first embodiment as a negative electrode active material. Therefore, the secondary battery can exhibit excellent quick charge/discharge performance and high energy densities.

Fourth Embodiment

According to a fourth embodiment, a battery module is provided. The battery module according to the fourth embodiment includes plural secondary batteries according to the third embodiment.

In the battery module according to the fourth embodiment, each of the single batteries may be arranged electrically connected in series, in parallel, or in a combination of in-series connection and in-parallel connection.

An example of the battery module according to the fourth embodiment will be described next with reference to the drawings.

FIG. 7 is a perspective view schematically showing an example of the battery module according to the fourth embodiment. A battery module 200 shown in FIG. 7 includes five single-batteries 100a to 100e, four bus bars 21, a positive electrode-side lead 22, and a negative electrode-side lead 23. Each of the five single-batteries 100a to 100e is a secondary battery according to the third embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 7 is a battery module of five in-series connection.

As shown in FIG. 7, the positive electrode terminal 7 of the single-battery 100a located at left end among the five single-batteries 100a to 100e is connected to the positive electrode-side lead 22 for external connection. In addition, the negative electrode terminal 6 of the single-battery 100e located at the right end among the five single-batteries 100a to 100e is connected to the negative electrode-side lead 23 for external connection.

The battery module according to the fourth embodiment includes the secondary battery according to the third embodiment. Therefore, the battery module can exhibit excellent quick charge/discharge performance and high energy densities.

Fifth Embodiment

According to a fifth embodiment, a battery pack is provided. The battery pack includes a battery module according to the fourth embodiment. The battery pack may include a single secondary battery according to the third embodiment, in place of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fifth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

FIG. 8 is an exploded perspective view schematically showing an example of the battery pack according to the fifth embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

The housing container 31 shown in FIG. 8 is a square bottomed container having a rectangular bottom surface. The housing container 31 is configured to be capable of storing the protection sheets 33, the battery module 200, the printed wiring board 34, and the wires 35. The lid 32 has a rectangular shape. The lid 32 covers the housing container 31 to house the battery module 200 and such. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and adhesive tape(s) 24.

A single-battery 100 has a structure shown in FIGS. 3 and 4. At least one of the plural single-batteries 100 is a secondary battery according to the third embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat-shrinkable tape in place of the adhesive tape(s) 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 is provided along one face in the short-side direction among the inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external device(s), based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 include a signal indicating detection of over-charge, over-discharge, and overcurrent of the single-battery (single-batteries) 100. When detecting overcharge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the fifth embodiment includes the secondary battery according to the third embodiment or the battery module according to the fourth embodiment. Therefore, the battery pack can exhibit excellent quick charge/discharge performance and high energy densities.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle. The vehicle may include a mechanism configured to convert kinetic energy of the vehicle into regenerative energy.

Examples of the vehicle according to the sixth embodiment include two-wheeled to four-wheeled hybrid electric automobiles, two-wheeled to four-wheeled electric automobiles, electrically assisted bicycles, and railway cars.

In the vehicle according to the sixth embodiment, the installing position of the battery pack is not particularly limited. For example, the battery pack may be installed in the engine compartment of the vehicle, in rear parts of the vehicle, or under seats.

The vehicle according to the sixth embodiment may have plural battery packs installed. In such a case, the battery packs may be electrically connected in series, electrically connected in parallel, or electrically connected in a combination of in-series connection and in-parallel connection.

An example of the vehicle according to the sixth embodiment is explained below, with reference to the drawings.

FIG. 10 is a cross-sectional view schematically showing an example of a vehicle according to the sixth embodiment.

A vehicle 400, shown in FIG. 10 includes a vehicle body 40 and a battery pack 300 according to the fifth embodiment. In the example shown in FIG. 10, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

In FIG. 10, the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 11, an aspect of operation of the vehicle according to the sixth embodiment is explained.

FIG. 11 is a view schematically showing another example of the vehicle according to the sixth embodiment. A vehicle 400, shown in FIG. 11, is an electric automobile.

The vehicle 400, shown in FIG. 11, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 11, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (e.g., a VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the third embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 11) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near the switch elements.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the sixth embodiment is installed with the battery pack according to the fifth embodiment. Therefore, according to the present embodiment, a vehicle equipped with a battery pack capable of exhibiting excellent quick charge/discharge performance and high energy densities can be provided.

EXAMPLES

Hereinafter, the above embodiment will be described in more detail based on examples.

Synthesis Method

Examples 1 to 34 and Comparative Example 1

In each example, the compounds shown in the "Composition" column of Tables 3 and 4 shown below were synthesized by the following procedure.

First, as starting materials, commercially available oxide reagents $TiO_2$, $Nb_2O_5$, $NiO$, $CuO$, $V_2O_5$, $ZnO$, $Fe_2O_3$, $CO_2O_3$, $Mn_2O_3$, $Al_2O_3$, $SnO_2$, $MgO$, $Ta_2O_5$, and $MoO_3$ were prepared. These powders were mixed so as to obtain the constituent molar ratio of compounds described in the column of "Composition" shown in Tables 3 and 4 and the resultant powder was put into a mortar. Ethanol was added to this mortar and wet mixing was conducted for one hour. Tables 1 and 2 summarize the starting materials and raw material molar ratios used in each example.

Next, the resultant mixture was put into an electric furnace and pre-fired at 800° C. for 12 hours. The powder after being subjected to the firing was pulverized in a mortar for one hour, put into the electric furnace again, and subjected to main firing (second firing) at 1200° C. for 12 hours. As a result, the total time for firing was 24 hours.

Thereafter, in order to obtain an active material of the target composition and the crystalline phase, the powder after the main firing was further annealed at 700° C. for two hours to obtain the target active material powder. However, in Example 2, Example 2a was produced by the same method as in Example 1, but in Example 2b, instead of annealing treatment, reduction treatment was performed at 700° C. for two hours in a hydrogen reduction atmosphere. This is intended to investigate the influence on the rate characteristic due to reduction of Nb and the element M2.

Comparative Example 2

$Fe_{0.8}Cr_{0.2}Nb_{11}O_{29}$ was synthesized by a conventionally known synthesis method. More specifically, the same method as the manufacturing method described in Non-Patent Document "Xiaoming Lou, Zhihao Xu, Zhibin Luo, Chunfu Lin, Chao Yang, Hua Zhao, Peng Zheng, Jianbao Li, Ning Wang, Yongjun Chen, and Hui Wu, Electrochimica Acta 245 (2017) 482-488" was used for synthesis by using $Fe_2O_3$, $Nb_2O_5$ and $Cr_2O_3$ prepared as commercially available oxide reagents. First, raw materials weighed so as to have a constituent molar ratio of the target compound was put into a mortar and wet mixing using ethanol was carried out for one hour in this mortar. Thereafter, the resultant mixture was put into a platinum crucible and fired at 1300° C. for four hours. In this manner, an active material powder according to Comparative Example 2 was obtained.

Comparative Example 3

A monoclinic composite oxide having a composition formula of $TiNb_{1.875}Mo_{0.1}Mg_{0.025}O_7$ was synthesized by the following procedure. Commercially available oxide reagents $Nb_2O_5$, $TiO_2$, $MoO_2$, and $MgO$ were used as starting materials. These powders were weighed so as to have a constituent molar ratio of $TiNb_{1.875}Mo_{0.1}Mg_{0.025}O_7$ and mixed in a mortar. The obtained mixture was put into an electric furnace and fired at 1000° C. for a total of 36 hours. In this manner, an active material powder according to Comparative Example 3 was obtained.

Comparative Example 4

A monoclinic composite oxide having a composition formula of $TiNb_2O_7$ was synthesized by the following procedure. Commercial oxide reagents $Nb_2O_5$ and $TiO_2$ were used as starting materials. These raw material powders were weighed to have a molar ratio of 1:1 and mixed in a mortar. The resulting mixture was put into an electric furnace and fired at 1200° C. for two hours. In this manner, an active material powder according to Comparative Example 4 was obtained.

Tables 1 and 2 below show the raw materials and raw material molar ratios used for each of Examples and Comparative Examples.

TABLE 1

| | Fe source/amount | Nb source/amount | M1 source/amount | M2 source/amount |
|---|---|---|---|---|
| Example 1 | $Fe_2O_3$/0.5 | $Nb_2O_5$/5.495 | — | $Ta_2O_5$/0.005 |
| Example 2a | $Fe_2O_3$/0.495 | $Nb_2O_5$/5.495 | $Co_2O_3$/0.005 | $Ta_2O_5$/0.005 |
| Example 2b | $Fe_2O_3$/0.495 | $Nb_2O_5$/5.495 | $Co_2O_3$/0.005 | $Ta_2O_5$/0.005 |
| Example 3 | $Fe_2O_3$/0.495 | $Nb_2O_5$/5.45 | $Co_2O_3$/0.005 | $Ta_2O_5$/0.05 |
| Example 4 | $Fe_2O_3$/0.495 | $Nb_2O_5$/5.25 | $Co_2O_3$/0.005 | $Ta_2O_5$/0.25 |
| Example 5 | $Fe_2O_3$/0.495 | $Nb_2O_5$/5.0 | $Co_2O_3$/0.005 | $Ta_2O_5$/0.5 |
| Example 6 | $Fe_2O_3$/0.495 | $Nb_2O_5$/4.0 | $Co_2O_3$/0.005 | $Ta_2O_5$/1.5 |
| Example 7 | $Fe_2O_3$/0.495 | $Nb_2O_5$/2.5 | $Co_2O_3$/0.005 | $Ta_2O_5$/3.0 |
| Example 8 | $Fe_2O_3$/0.495 | $Nb_2O_5$/5.45 | $Co_2O_3$/0.005 | $V_2O_5$/0.05 |
| Example 9 | $Fe_2O_3$/0.495 | $Nb_2O_5$/5.45 | $Co_2O_3$/0.005 | $TiO_2$/0.05 $MoO_3$/0.05 |
| Example 10 | $Fe_2O_3$/0.495 | $Nb_2O_5$/5.45 | $Co_2O_3$/0.005 | $SnO_2$/0.05 $MoO_3$/0.05 |
| Example 11 | $Fe_2O_3$/0.495 | $Nb_2O_5$/5.45 | $Co_2O_3$/0.005 | $Fe_2O_3$/0.0165 $MoO_3$/0.067 |
| Example 12 | $Fe_2O_3$/0.495 | $Nb_2O_5$/5.45 | $Co_2O_3$/0.005 | $Co_2O_3$/0.0165 $MoO_3$/0.067 |
| Example 13 | $Fe_2O_3$/0.495 | $Nb_2O_5$/5.45 | $Co_2O_3$/0.005 | $Mn_2O_3$/0.0165 $MoO_3$/0.067 |
| Example 14 | $Fe_2O_3$/0.495 | $Nb_2O_5$/5.45 | $Co_2O_3$/0.005 | $Al_2O_3$/0.0165 $MoO_3$/0.067 |
| Example 15 | $Fe_2O_3$/0.495 | $Nb_2O_5$/5.45 | $Co_2O_3$/0.005 | $NiO$/0.033 $MoO_3$/0.067 |
| Example 16 | $Fe_2O_3$/0.495 | $Nb_2O_5$/5.45 | $Co_2O_3$/0.005 | $CuO$/0.025 $MoO_3$/0.075 |
| Example 17 | $Fe_2O_3$/0.495 | $Nb_2O_5$/5.45 | $Co_2O_3$/0.005 | $MgO$/0.025 $MoO_3$/0.075 |
| Example 18 | $Fe_2O_3$/0.495 | $Nb_2O_5$/5.45 | $Co_2O_3$/0.005 | $ZnO$/0.025 $MoO_3$/0.075 |

TABLE 2

| | Fe source/amount | Nb source/amount | M1 source/amount | M2 source/amount |
|---|---|---|---|---|
| Example 19 | $Fe_2O_3$/0.45 | $Nb_2O_5$/5.45 | $Co_2O_3$/0.05 | $Ta_2O_5$/0.05 |
| Example 20 | $Fe_2O_3$/0.35 | $Nb_2O_5$/5.45 | $Co_2O_3$/0.15 | $Ta_2O_5$/0.05 |
| Example 21 | $Fe_2O_3$/0.25 | $Nb_2O_5$/5.45 | $Co_2O_3$/0.25 | $Ta_2O_5$/0.05 |
| Example 22 | $Fe_2O_3$/0.15 | $Nb_2O_5$/5.45 | $Co_2O_3$/0.35 | $Ta_2O_5$/0.05 |
| Example 23 | — | $Nb_2O_5$/5.45 | $Co_2O_3$/0.5 | $Ta_2O_5$/0.05 |
| Example 24 | $Fe_2O_3$/0.45 | $Nb_2O_5$/5.45 | $Al_2O_3$/0.05 | $Ta_2O_5$/0.05 |
| Example 25 | $Fe_2O_3$/0.45 | $Nb_2O_5$/5.45 | $NiO$/0.1 | $Ta_2O_5$/0.05 |
| Example 26 | $Fe_2O_3$/0.45 | $Nb_2O_5$/5.45 | $Mn_2O_3$/0.05 | $Ta_2O_5$/0.05 |
| Example 27 | $Fe_2O_3$/0.45 | $Nb_2O_5$/5.45 | $MgO$/0.05 $TiO_2$/0.05 | $Ta_2O_5$/0.05 |
| Example 28 | $Fe_2O_3$/0.45 | $Nb_2O_5$/5.45 | $MgO$/0.05 $SnO_2$/0.05 | $Ta_2O_5$/0.05 |
| Example 29 | $Fe_2O_3$/0.45 | $Nb_2O_5$/5.45 | $MgO$/0.067 | $Ta_2O_5$/0.0165 |
| Example 30 | $Fe_2O_3$/0.45 | $Nb_2O_5$/5.45 | $MgO$/0.067 | $Ta_2O_5$/0.05 $Nb_2O_5$/0.0165 |
| Example 31 | $Fe_2O_3$/0.45 | $Nb_2O_5$/5.45 | $MgO$/0.067 | $Ta_2O_5$/0.05 $V_2O_5$/0.0165 |
| Example 32 | $Fe_2O_3$/0.45 | $Nb_2O_5$/5.45 | $MgO$/0.075 $MoO_3$/0.025 | $Ta_2O_5$/0.05 |
| Example 33 | $Fe_2O_3$/0.45 | $Nb_2O_5$/5.45 | $CuO$/0.075 $MoO_3$/0.025 | $Ta_2O_5$/0.05 |
| Example 34 | $Fe_2O_3$/0.45 | $Nb_2O_5$/5.45 | $ZnO$/0.075 $MoO_3$/0.025 | $Ta_2O_5$/0.05 |
| Comparative example 1 | $Fe_2O_3$/0.5 | $Nb_2O_5$/5.5 | — | — |
| Comparative example 2 | $Fe_2O_3$/0.4 | $Nb_2O_5$/5.5 | $Cr_2O_3$/0.1 | — |
| Comparative example 3 | — | $Nb_2O_5$/0.9375 | $MoO_3$/0.1 $MgO$/0.025 $TiO_2$/1.0 | — |
| Comparative example 4 | — | $Nb_2O_5$/1.0 | $TiO_2$/1.0 | — |

<Powder X-Ray Diffraction Measurement, ICP Analysis, TEM-EDX Measurement, and XAFS>

Examples 1 to 34

For the powder synthesized in each example, the identification of the crystal phase, the estimation of the crystal structure and the determination of the space group were carried out by the powder X-ray diffraction method using Cu-Kα rays. The powder X-ray diffraction revealed that the active materials synthesized in Examples 1 to 34 had an orthorhombic crystal structure. Also, the composition of the products was analyzed by the ICP method, which confirmed that the target substance described in the "Composition" column of the Tables 3 and 4 shown above was obtained. As a result of TEM-EDX measurement, it turned out that the added elements (elements M1 and M2) entered the crystal lattice and formed a solid solution. Further, the X-ray absorption edge fine structure analysis (XAFS) was carried out to investigate the average valence number of Nb and the element M2 according to each example.

The powder X-ray diffraction measurement, ICP analysis and XAFS were carried out according to the methods described in the first embodiment.

Comparative Example 1

For the powder sample obtained by the above synthesis method, the powder X-ray diffraction measurement, ICP analysis, TEM-EDX measurement, and XAFS were carried out in the same manner as the measurements for each example. The powder X-ray diffraction revealed that the active material synthesized in Comparative Example 1 had an orthorhombic crystalline structure and the target crystal structure was obtained. The TEM-EDX measurement confirmed that a single phase of the target compound was obtained.

Comparative Example 2

For the powder sample obtained by the above synthesis method, the powder X-ray diffraction measurement, ICP analysis, TEM-EDX measurement, and XAFS were carried out in the same manner as the measurements for each example. The powder X-ray diffraction revealed that the active materials synthesized in Comparative Example 2 had an orthorhombic crystal structure. In addition, the main XRD peak almost agreed with that of $FeNb_{11}O_{29}$. The TEM-EDX measurement revealed that the added elements entered the crystal lattice and formed a solid solution.

Comparative Example 3

For the powder sample obtained by the above synthesis method, the powder X-ray diffraction measurement, ICP analysis, TEM-EDX measurement, and XAFS were carried out in the same manner as the measurements for each example. As a result, the main XRD peak perfectly matched with that of $TiNb_2O_7$.

Comparative Example 4

For the powder sample obtained by the above synthesis method, the powder X-ray diffraction measurement, ICP analysis, TEM-EDX measurement, and XAFS were carried out in the same manner as the measurements for each example. As a result, the main XRD peak perfectly matched with that of $TiNb_2O_7$.

<Electrochemical Measurements>

(Production of Electrochemical Measurement Cells)

First, electrochemical measurement cells for each of Examples and Comparative Examples were produced by the procedure described below.

Acetylene black was mixed as a conductive agent with the active material powder obtained in each example. 10 parts by mass of acetylene black was mixed with 100 parts by mass of the active material as a mixing ratio. The mixture was dispersed in N-methyl-2-pyrrolidone (NMP). Polyvinylidene fluoride (PVdF) was mixed as a binder with the obtained dispersion solution to produce an electrode slurry. PVdF was used in an amount of 10 parts by mass with respect to 100 parts by mass of the active material. The slurry was applied to both surfaces of a current collector made of aluminum foil using a blade. Then, the slurry was dried at 130° C. under vacuum for 12 hours to obtain an electrode.

On the other hand, ethylene carbonate and diethyl carbonate were mixed in a ratio by volume of 1:1 to prepare a mixed solvent. Lithium hexafluorophosphate was dissolved in the mixed solvent in a concentration of 1M to prepare a nonaqueous electrolyte.

The electrode produced above, metal lithium foil as a counter electrode, and the prepared nonaqueous electrolyte were used to produce an electrochemical measurement cell.

(25° C. Rate Performance Evaluation)

Using each produced electrochemical measurement cell, a charge/discharge test was carried out in a thermostat at 25° C. The charge/discharge test was carried out in a potential range of 1.0 V or more and 3.0 V or less (vs.Li/Li$^+$) relative to an oxidation-reduction potential of lithium and at a charge/discharge current of 0.2 C (hourly discharge rate). As a result, the 0.2 C discharge capacity was measured. In order to keep the internal temperature of each electrochemical measurement cell constant, the cell was allowed to leave in a thermostat at 25° C. for three hours before the charge/discharge test.

Further, after charging at 25° C. at 0.2 C, discharge was carried out at 5 C and the 5 C discharge capacity was measured. The ratio of the 5 C discharge capacity at 25° C. to the 0.2 C discharge capacity at 25° C. measured before (0.2 C discharge capacity [25° C.]/5 C discharge capacity [25° C.]×100%) was calculated.

(−20° C. Rate Performance Evaluation)

After charging at 25° C. at 0.2 C, the cell was left at rest in a thermostat at −20° C. for three hours. Then, the discharge was carried out at −20° C. at 5 C, and the 5 C discharge capacity was measured. The ratio of the 5 C discharge capacity at −20° C. to the 0.2 C discharge capacity at 25° C. measured before (0.2 C discharge capacity [25° C.]/5 C discharge capacity [−20° C.]×100%) was calculated.

The above results are summarized in Tables 3 and 4 below. Table 3 shows the results of Examples 1 to 18. Table 4 shows the results of Examples 19 to 34 and Comparative Examples 1 to 4. In Tables 3 and 4, "Space group" determined by powder X-ray diffraction measurements, "0.2 C discharge capacity [mAh/g]", "5 C/0.2 C discharge capacity ratio @ 25° C.", and "5 C/0.2 C discharge capacity ratio @-20° C." measured by electrochemical measurements, and "Pentavalent element average valence number" analyzed by XAFS are shown. The pentavalent element average valence number is the average valence number of Nb and the metal element M2 in the general formula $Li_xFe_{1-y}M1_yNb_{11-z}M2_zO_{29}$.

TABLE 3

| | Composition | Space group | 0.2 C discharge capacity [mAh/g] | 5 C/0.2 C discharge capacity ratio @25° C. | 5 C/0.2 C discharge capacity ratio @-20° C. | Pentavalent element average valence number |
|---|---|---|---|---|---|---|
| Example 1 | $FeNb_{10.99}Ta_{0.01}O_{29}$ (X = 0, y = 0, z = 0.01) | Amma | 219 | 0.81 | 0.65 | 5 |
| Example 2a | $Fe_{0.99}Co_{0.01}Nb_{10.99}Ta_{0.01}O_{29}$ (X = 0, y = 0.01, z = 0.01) | Amma | 231 | 0.82 | 0.68 | 5 |
| Example 2b | $Fe_{0.99}Co_{0.01}Nb_{10.99}Ta_{0.01}O_{29}$ (X = 0, y = 0.01, z = 0.01) | Amma | 220 | 0.81 | 0.67 | 4.89 |
| Example 3 | $Fe_{0.99}Co_{0.01}Nb_{10.9}Ta_{0.1}O_{29}$ (X = 0, y = 0.01, z = 0.1) | Amma | 232 | 0.83 | 0.71 | 5 |
| Example 4 | $Fe_{0.99}Co_{0.01}Nb_{10.5}Ta_{0.5}O_{29}$ (X = 0, y = 0.01, z = 0.5) | Amma | 235 | 0.84 | 0.75 | 5 |
| Example 5 | $Fe_{0.99}Co_{0.01}Nb_{10}TaO_{29}$ (X = 0, y = 0.01, z = 1.0) | Amma | 229 | 0.84 | 0.77 | 5 |
| Example 6 | $Fe_{0.99}Co_{0.01}Nb_8Ta_3O_{29}$ (X = 0, y = 0.01, z = 3.0) | Amma | 231 | 0.84 | 0.78 | 5 |
| Example 7 | $Fe_{0.99}Co_{0.01}Nb_5Ta_6O_{29}$ (X = 0, y = 0.01, z = 6.0) | Amma | 220 | 0.85 | 0.79 | 5 |
| Example 8 | $Fe_{0.99}Co_{0.01}Nb_{10.9}V_{0.1}O_{29}$ (X = 0, y = 0.01, z = 0.1) | Amma | 235 | 0.88 | 0.74 | 4.99 |
| Example 9 | $Fe_{0.99}Co_{0.01}Nb_{10.9}(Ti_{0.5}Mo_{0.5})_{0.1}O_{29}$ (X = 0, y = 0.01, z = 0.1) | Amma | 235 | 0.9 | 0.82 | 5 |
| Example 10 | $Fe_{0.99}Co_{0.01}Nb_{10.9}(Sn_{0.5}Mo_{0.5})_{0.1}O_{29}$ (X = 0, y = 0.01, z = 0.1) | Amma | 238 | 0.92 | 0.85 | 4.98 |
| Example 11 | $Fe_{0.99}Co_{0.01}Nb_{10.9}(Fe_{0.33}Mo_{0.67})_{0.1}O_{29}$ (X = 0, y = 0.01, z = 0.1) | Amma | 232 | 0.91 | 0.88 | 4.99 |
| Example 12 | $Fe_{0.99}Co_{0.01}Nb_{10.9}(Co_{0.33}Mo_{0.67})_{0.1}O_{29}$ (X = 0, y = 0.01, z = 0.1) | Amma | 228 | 0.9 | 0.86 | 5 |
| Example 13 | $Fe_{0.99}Co_{0.01}Nb_{10.9}(Mn_{0.33}Mo_{0.67})_{0.1}O_{29}$ (X = 0, y = 0.01, z = 0.1) | Amma | 225 | 0.89 | 0.84 | 5 |
| Example 14 | $Fe_{0.99}Co_{0.01}Nb_{10.9}(Al_{0.33}Mo_{0.67})_{0.1}O_{29}$ (X = 0, y = 0.01, z = 0.1) | Amma | 223 | 0.88 | 0.81 | 5 |
| Example 15 | $Fe_{0.99}Co_{0.01}Nb_{10.9}(Ni_{0.33}Mo_{0.67})_{0.1}O_{29}$ (X = 0, y = 0.01, z = 0.1) | Amma | 221 | 0.87 | 0.81 | 4.99 |
| Example 16 | $Fe_{0.99}Co_{0.01}Nb_{10.9}(Cu_{0.25}Mo_{0.75})_{0.1}O_{29}$ (X = 0, y = 0.01, z = 0.1) | Amma | 222 | 0.85 | 0.82 | 5 |
| Example 17 | $Fe_{0.99}Co_{0.01}Nb_{10.9}(Mg_{0.25}Mo_{0.75})_{0.1}O_{29}$ (X = 0, y = 0.01, z = 0.1) | Amma | 230 | 0.93 | 0.89 | 4.99 |
| Example 18 | $Fe_{0.99}Co_{0.01}Nb_{10.9}(Zn_{0.25}Mo_{0.75})_{0.1}O_{29}$ (X = 0, y = 0.01, z = 0.1) | Amma | 224 | 0.9 | 0.85 | 5 |

TABLE 4

| | Composition | Space group | 0.2 C discharge capacity [mAh/g] | 5 C/0.2 C discharge capacity ratio @25° C. | 5 C/0.2 C discharge capacity ratio @-20° C. | Pentavalent element average valence number |
|---|---|---|---|---|---|---|
| Example 19 | $Fe_{0.9}Co_{0.1}Nb_{10.9}Ta_{0.1}O_{29}$ (X = 0, y = 0.1, z = 0.1) | Amma | 229 | 0.84 | 0.71 | 5 |
| Example 20 | $Fe_{0.7}Co_{0.3}Nb_{10.9}Ta_{0.1}O_{29}$ (X = 0, y = 0.3, z = 0.1) | Amma | 226 | 0.85 | 0.72 | 5 |
| Example 21 | $Fe_{0.5}Co_{0.5}Nb_{10.9}Ta_{0.1}O_{29}$ (X = 0, y = 0.5, z = 0.1) | Amma | 225 | 0.85 | 0.72 | 4.9 |
| Example 22 | $Fe_{0.3}Co_{0.7}Nb_{10.9}Ta_{0.1}O_{29}$ (X = 0, y = 0.7, z = 0.1) | Amma | 221 | 0.86 | 0.74 | 5 |
| Example 23 | $CoNb_{10.9}Ta_{0.1}O_{29}$ (X = 0, y = 1.0, z = 0.1) | Amma | 220 | 0.84 | 0.7 | 5 |
| Example 24 | $Fe_{0.9}Al_{0.1}Nb_{10.9}Ta_{0.1}O_{29}$ (X = 0, y = 0.1, z = 0.1) | Amma | 226 | 0.83 | 0.71 | 5 |
| Example 25 | $Fe_{0.9}Ni_{0.1}Nb_{10.9}Ta_{0.1}O_{29}$ (X = 0, y = 0.1, z = 0.1) | Amma | 223 | 0.83 | 0.72 | 4.99 |

TABLE 4-continued

| | Composition | Space group | 0.2 C discharge capacity [mAh/g] | 5 C/0.2 C discharge capacity ratio @25° C. | 5 C/0.2 C discharge capacity ratio @−20° C. | Pentavalent element average valence number |
|---|---|---|---|---|---|---|
| Example 26 | $Fe_{0.9}Mn_{0.1}Nb_{10.9}Ta_{0.1}O_{29}$ (X = 0, y = 0.1, z = 0.1) | Amma | 224 | 0.84 | 0.71 | 5 |
| Example 27 | $Fe_{0.9}(Mg_{0.5}Ti_{0.5})_{0.1}Nb_{10.9}Ta_{0.1}O_{29}$ (X = 0, y = 0.1, z = 0.1) | Amma | 235 | 0.86 | 0.74 | 5 |
| Example 28 | $Fe_{0.9}(Mg_{0.5}Sn_{0.5})_{0.1}Nb_{10.9}Ta_{0.1}O_{29}$ (X = 0, y = 0.1, z = 0.1) | Amma | 235 | 0.86 | 0.76 | 4.99 |
| Example 29 | $Fe_{0.9}(Mg_{0.67}Ta_{0.33})_{0.1}Nb_{10.9}Ta_{0.1}O_{29}$ (X = 0, y = 0.1, z = 0.1) | Amma | 231 | 0.84 | 0.73 | 5 |
| Example 30 | $Fe_{0.9}(Mg_{0.67}Nb_{0.33})_{0.1}Nb_{10.9}Ta_{0.1}O_{29}$ (X = 0, y = 0.1, z = 0.1) | Amma | 232 | 0.85 | 0.75 | 5 |
| Example 31 | $Fe_{0.9}(Mg_{0.67}V_{0.33})_{0.1}Nb_{10.9}Ta_{0.1}O_{29}$ (X = 0, y = 0.1, z = 0.1) | Amma | 228 | 0.86 | 0.74 | 4.99 |
| Example 32 | $Fe_{0.9}(Mg_{0.75}Mo_{0.25})_{0.1}Nb_{10.9}Ta_{0.1}O_{29}$ (X = 0, y = 0.1, z = 0.1) | Amma | 225 | 0.87 | 0.76 | 5 |
| Example 33 | $Fe_{0.9}(Cu_{0.75}Mo_{0.25})_{0.1}Nb_{10.9}Ta_{0.1}O_{29}$ (X = 0, y = 0.1, z = 0.1) | Amma | 222 | 0.85 | 0.73 | 5 |
| Example 34 | $Fe_{0.9}(Zn_{0.75}Mo_{0.25})_{0.1}Nb_{10.9}Ta_{0.1}O_{29}$ (X = 0, y = 0.1, z = 0.1) | Amma | 221 | 0.84 | 0.72 | 4.99 |
| Comparative example 1 | $FeNb_{11}O_{29}$ (X = 0, y = 0, z = 0) | Amma | 210 | 0.71 | 0.59 | 5 |
| Comparative example 2 | $Fe_{0.8}Cr_{0.2}Nb_{11}O_{29}$ (X = 0, y = 0.2, z = 0) | Amma | 215 | 0.73 | 0.59 | 5 |
| Comparative example 3 | $TiNb_{1.875}Mo_{0.1}Mg_{0.025}O_7$ | C2/m | 258 | 0.89 | 0.63 | 4.99 |
| Comparative example 4 | $TiNb_2O_7$ | C2/m | 240 | 0.85 | 0.6 | 4.93 |

As shown in the examples, an active material comprising a lithium niobium composite oxide having an orthorhombic crystal structure and represented by the general formula $Li_xFe_{1-y}M1_yNb_{11-z}M2_zO_{29}$ where $0 \leq x \leq 23$, $0 \leq y \leq 1$ and $0 < z \leq 6$ are satisfied and each of M1 and M2 includes at least one element selected from a group consisting of Mg, Al, Cu, Mn, Co, Ni, Zn, Sn, Ti, Ta, V and Mo was well-balanced in discharge capacity, 25° C. rate performance and −20° C. rate performance.

For example, Example 1 is an example containing 0.01 mol of Ta as the M2 site, but compared with Comparative Example 1 in which the M2 site is not substituted, Example 1 is remarkably excellent in 0.2 C discharge capacity and rate performance. It turns out that even if the amount of substitution of the M2 site is small, a large effect can be obtained.

Example 2a was excellent, compared with Example 1, in all of the 0.2 C discharge capacity, 25° C. rate performance, and −20° C. rate performance. This can be considered to result from the substitution of a metal element (here, Co) for a portion of Fe.

For example, from the comparison between Example 2a and Examples 3 to 7, it turns out that when z in the general formula $Li_xFe_{1-y}M1_yNb_{11-z}M2_zO_{29}$ is $0.1 \leq z \leq 6.0$, the rate performance is more excellent. However, when z>3.0, the charge/discharge capacity greatly decreases.

As shown in Examples 8 to 10, when the M2 site of the general formula $Li_xFe_{1-y}M1_yNb_{11-z}M2_zO_{29}$ contains at least one element selected from a group consisting of Ti, V, and Sn, a high 0.2 C discharge capacity of 235 mAh/g or more was achieved. This is because Ti, V and Sn as substitution elements contribute to oxidation-reduction by charging and discharging.

In Examples 9 to 18 in which the M2 site contains elements having mutually different valence numbers, both the 25° C. rate performance and the −20° C. rate performance were markedly superior to those of, for example, Example 3. A similar tendency is also seen for the M1 site, but it is understood that the effect is higher when containing elements having mutually different valence numbers at the M2 site.

Also, as is clear from the comparison between Example 2a and Example 2b, when the average valence number of Nb and the metal element M2 is lower than 4.95, the capacity decreases and the element substitution effect of the M1 site and the M2 site also decreases. This can be considered to be caused by lower electrochemical activity due to preliminary reduction of Nb and the metal element M2.

For example, from the comparison between Comparative Example 1 and Comparative Example 2, it is clear that even if a portion of Fe is substituted with Cr, the effect of capacity improvement and rate performance improvement is hardly obtained. Also, the low-temperature rate performance has not improved.

Both of Comparative Example 3 and Comparative Example 4 are active materials having a monoclinic crystal structure. Comparative Example 3 is an example in which a portion of Nb is substituted with Mo and Mg in $TiNb_2O_7$, which is the composition of Comparative Example 4. Hereinafter, Comparative Examples 3 and 4 having a monoclinic crystal structure are compared with Example 3 and Comparative Example 1 having an orthorhombic crystal structure.

Example 3 is an example in which the M2 site is substituted with 0.1 mol of Ta in $FeNb_{11}O_{29}$ as a composition of Comparative Example 1. In Example 3, the M1 site is also substituted with 0.01 mol of Co, but it is clear from the comparison of Example 1 and Example 2a that the effect of the rate performance improvement due to substitution of the M1 site is not so large. That is, the rate performance is remarkably improved in Example 3 as compared with Comparative Example 1, mainly because the M2 site is substituted with 0.1 mol of Ta. Thus, in the lithium niobium composite oxide having the orthorhombic crystal structure, the effect by substituting the M2 site with a specific metal is great.

On the other hand, Comparative Example 3 is an example in which, as described above, a portion of Nb is substituted with Mo and Mg in TiNb$_2$O$_7$ as the composition of Comparative Example 4. Though the capacity of Comparative Example 3 is greatly improved as compared with Comparative Example 4, the effect of improving rate performance is not so large. Thus, in the case of an active material having a monoclinic crystal structure, even if a portion of Nb is substituted with a specific metal, significant improvements of rate performance cannot be expected. This is because, in the case of a monoclinic crystal structure, a conduction path through which lithium ions easily move due to distortion of a bottleneck portion constituted by oxide ions has been clarified, and thus local distortion by substitution of elements with different valence numbers is not needed.

According to at least one of the embodiments and examples described above, an active material is provided. The active material includes a lithium niobium composite oxide represented by a general formula Li$_x$Fe$_{1-y}$M1$_y$Nb$_{11-z}$M2$_z$O$_{29}$ (1) and having an orthorhombic crystal structure. In the general formula (1), $0 \leq x \leq 23$, $0 \leq y \leq 1$, and $0 < z \leq 6$ are satisfied and each of M1 and M2 independently includes at least one element selected from a group consisting of Fe, Mg, Al, Cu, Mn, Co, Ni, Zn, Sn, Ti, Ta, V, and Mo. The active material can realize a secondary battery capable of exhibiting excellent low-temperature rate performance and high energy densities.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising a lithium niobium composite oxide represented by a general formula Li$_x$Fe$_{1-y}$M1$_y$Nb$_{11-z}$M2$_z$O$_{29}$ (1) and having an orthorhombic crystal structure,
   wherein in the general formula (1), $0 \leq x \leq 23$, $0 \leq y \leq 1$ and $0 < z \leq 3.0$ are satisfied and each of M1 and M2 independently comprises at least one element selected from a group consisting of Fe, Mg, Al, Cu, Mn, Co, Ni, Zn, Sn, Ti, Ta, V, and Mo.

2. The active material according to claim 1, wherein in the general formula (1), $0 < y \leq 1$ is satisfied.

3. The active material according to claim 1, wherein the M2 comprises elements selected from the group consisting of Fe, Mg, Al, Cu, Mn, Co, Ni, Zn, Sn, Ti, Ta, V, and Mo, and the elements have mutually different valence numbers.

4. The active material according to claim 1, wherein the M1 comprises elements selected from the group consisting of Fe, Mg, Al, Cu, Mn, Co, Ni, Zn, Sn, Ti, Ta, V, and Mo, and the elements have mutually different valence numbers.

5. The active material according to claim 1, wherein at least one of the M1 and the M2 comprises at least one element selected from a group consisting of Ti, V, and Sn.

6. The active material according to claim 1, wherein the lithium niobium composite oxide has a crystal system of a space group represented by Amma.

7. An electrode comprising the active material according to claim 1.

8. The electrode according to claim 7, which comprises an active material-containing layer comprising the active material.

9. A secondary battery comprising:
   a positive electrode;
   a negative electrode; and
   an electrolyte, wherein
   the negative electrode is the electrode according to claim 7.

10. A battery pack comprising the secondary battery according to claim 9.

11. The battery pack according to claim 10, further comprising:
    an external power distribution terminal; and
    a protective circuit.

12. The battery pack according to claim 10, comprising plural of the secondary battery, wherein the secondary batteries are electrically connected in series, in parallel, or in a combination of series connection and parallel connection.

13. A vehicle comprising the battery pack according to claim 10.

14. The vehicle according to claim 13, which comprises a mechanism configured to convert kinetic energy of the vehicle into regenerative energy.

* * * * *